United States Patent
Kato

(10) Patent No.: US 8,956,775 B2
(45) Date of Patent: Feb. 17, 2015

(54) FUEL CELL SYSTEM AND METHOD OF DETECTING ABNORMALITY OF FUEL CELL SYSTEM

(75) Inventor: Manabu Kato, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 599 days.

(21) Appl. No.: 13/120,771

(22) PCT Filed: Sep. 24, 2009

(86) PCT No.: PCT/IB2009/006938
§ 371 (c)(1),
(2), (4) Date: Mar. 24, 2011

(87) PCT Pub. No.: WO2010/035113
PCT Pub. Date: Apr. 1, 2010

(65) Prior Publication Data
US 2011/0171549 A1    Jul. 14, 2011

(30) Foreign Application Priority Data

Sep. 25, 2008  (JP) ................................ 2008-245375

(51) Int. Cl.
*H01M 8/04* (2006.01)
*H01M 8/10* (2006.01)
(52) U.S. Cl.
CPC ...... *H01M 8/04664* (2013.01); *H01M 8/04552* (2013.01); *H01M 8/04559* (2013.01);
(Continued)

(58) Field of Classification Search
None
See application file for complete search history.

(56) References Cited

U.S. PATENT DOCUMENTS

| 6,156,447 A | 12/2000 | Bette et al. |
| 2003/0039869 A1 | 2/2003 | Murakami et al. |
| 2005/0064252 A1* | 3/2005 | Kusakabe et al. ............... 429/13 |

FOREIGN PATENT DOCUMENTS

| CN | 1538548 A | 10/2004 |
| DE | 10 2005 037 408 A1 | 3/2007 |

(Continued)

OTHER PUBLICATIONS

International Search Report and Written Opinion for corresponding International Patent Application No. PCT/IB2009/006938 mailed Feb. 4, 2010.

(Continued)

*Primary Examiner* — Patrick Ryan
*Assistant Examiner* — Christopher Domone
(74) *Attorney, Agent, or Firm* — Sughrue Mion, PLLC

(57) ABSTRACT

A fuel cell system and an abnormality detecting method therefore is provided. The fuel cell system includes: a fuel cell that includes at least one fuel-cell cell having an anode, a cathode and an electrolyte membrane, an anode-side passage supplying and exhausting fuel gas to and from the anode, a cathode-side passage supplying and exhausting oxidation gas to and from the cathode, a voltage detecting unit detecting a fuel cell voltage, a suppressing unit setting a suppression state where, after terminating normal power generation, introduction of the fuel and oxidation gas to the anode-side and cathode-side passages and emission of the fuel and oxidation gas from the anode-side and cathode-side passages to outsides are suppressed as compared with those during the normal power generation; and an abnormality detecting unit, after setting the suppression state, detecting abnormality of the fuel cell system based on the detected voltage or a variation thereof.

28 Claims, 12 Drawing Sheets

(52) U.S. Cl.
CPC ...... *H01M8/04671* (2013.01); *H01M 8/04679* (2013.01); *H01M 8/04223* (2013.01); *H01M 2008/1095* (2013.01); *Y02E 60/50* (2013.01)
USPC .......................................................... 429/429

(56) References Cited

FOREIGN PATENT DOCUMENTS

| EP | 1 487 044 A2 | 12/2004 |
|---|---|---|
| JP | 2000-513134 A | 10/2000 |
| JP | 2003-045467 A | 2/2003 |
| JP | 2004-146084 A | 5/2004 |
| JP | 2004-335448 A | 11/2004 |
| JP | 2005-129243 A | 5/2005 |
| JP | 2005-347185 A | 12/2005 |
| JP | 2006-351396 A | 12/2006 |
| JP | 2007-193952 A | 8/2007 |
| JP | 2008-153079 A | 7/2008 |

OTHER PUBLICATIONS

U.S. Appl. No. 14/065,970, filed Oct. 29, 2013.
Communication dated Oct. 6, 2014 from the United States Patent and Trademark Office in counterpart U.S. Appl. No. 14/065,970.

* cited by examiner

NORMAL TIME (AMOUNT OF HYDROGEN IS LARGE OR AMOUNT OF HYDROGEN IS SMALL)

ABNORMAL TIME (AMOUNT OF HYDROGEN IS LARGE)

$\Delta Xf = Xt1$ or $Xt2$ POINT

ABNORMAL TIME (AMOUNT OF HYDROGEN IS SMALL)

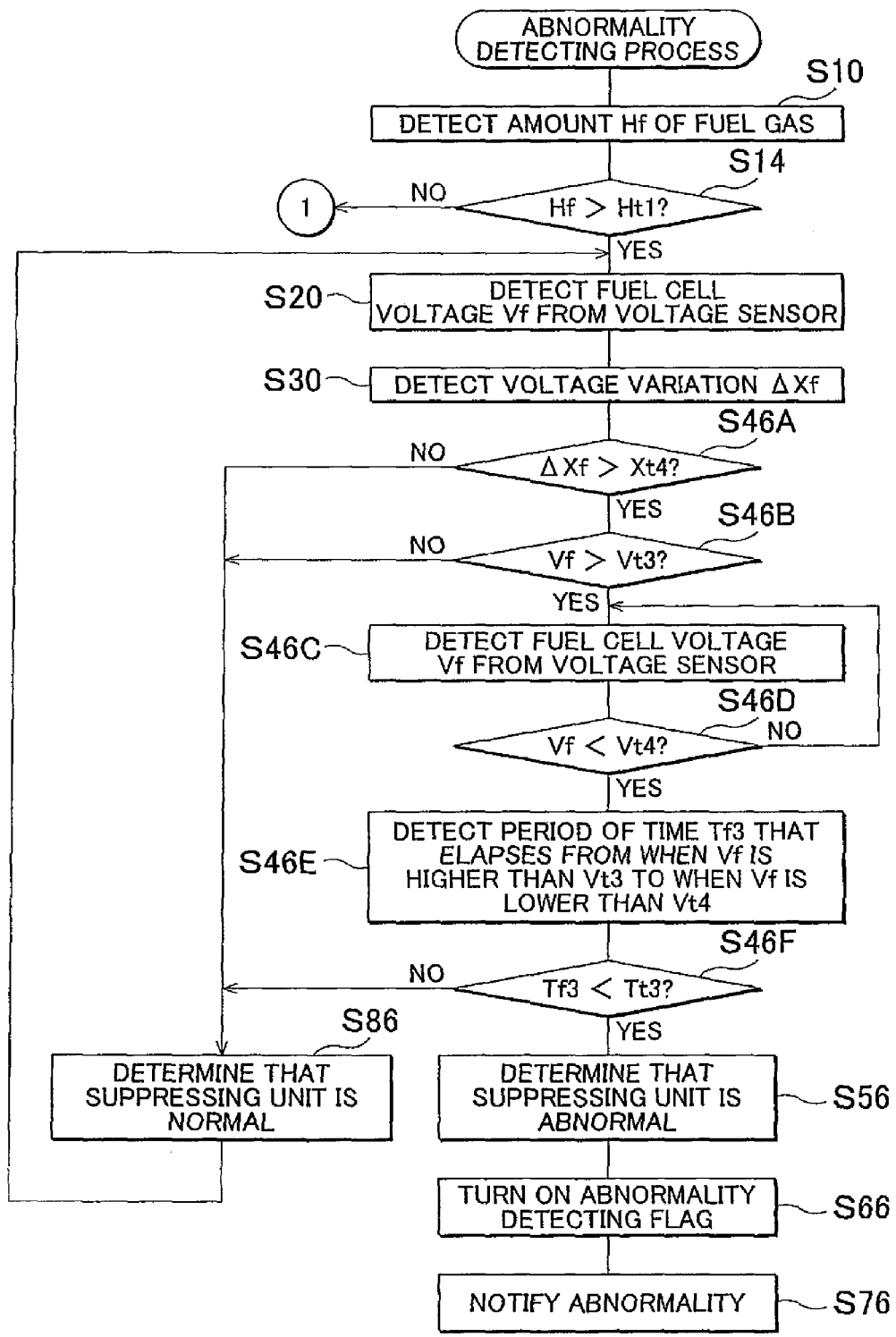

FUEL CELL SYSTEM AND METHOD OF DETECTING ABNORMALITY OF FUEL CELL SYSTEM

INCORPORATION BY REFERENCE

The disclosure of Japanese Patent Application No. 2008-245375 filed on Sep. 25, 2008, including the specification, drawings and abstract is incorporated herein by reference in its entirety.

BACKGROUND OF THE INVENTION

1. Field of the Invention

The invention relates to a fuel cell system equipped with a fuel cell and a method of detecting abnormality of the fuel cell system.

2. Description of the Related Art

In a fuel cell system equipped with a fuel cell, fuel gas is supplied to an anode of the fuel cell, and oxidation gas is supplied to a cathode of the fuel cell. In this fuel cell system, when normal power generation of the fuel cell is terminated, supply of fuel gas and oxidation gas is stopped.

However, in an existing fuel cell system described in Japanese Patent Application Publication No. 2004-146084 (JP-A-2004-146084), after supply of fuel gas and oxidation gas is stopped, for example, cross leakage occurs between the anode and the cathode to cause gas concentration distribution in the anode and in the cathode. As a result, there is a possibility that oxidation reaction partially occurs in the cathode to degrade the fuel cell.

SUMMARY OF THE INVENTION

The invention provides a fuel cell system that suppresses degradation of a fuel cell and a method of detecting abnormality of the fuel cell system.

An aspect of the invention provides a fuel cell system. The fuel cell system includes a fuel cell that includes at least one fuel-cell cell having an anode, a cathode and an electrolyte membrane; an anode-side passage that supplies and exhausts fuel gas to and from the anode of the at least one fuel-cell cell; a cathode-side passage that supplies and exhausts oxidation gas to and from the cathode of the at least one fuel-cell cell; a voltage detecting unit that detects a voltage of the fuel cell; a suppressing unit that forms a suppression state where, after normal power generation in the fuel cell is terminated, introduction of the fuel gas to the anode-side passage and introduction of the oxidation gas to the cathode-side passage are suppressed as compared with those during the normal power generation, and emission of the fuel gas from the anode-side passage to an outside of the anode-side passage and emission of the oxidation gas from the cathode-side passage to an outside of the cathode-side passage are suppressed as compared with those during the normal power generation; and an abnormality detecting unit that, after the suppression state is set by the suppressing unit, detects abnormality of the fuel cell system on the basis of the voltage detected by the voltage detecting unit or a variation in the detected voltage. With the thus configured fuel cell system, it is possible to suppress degradation of the fuel cell.

In addition, the fuel cell system may further include a voltage variation detecting unit that detects a voltage variation at a predetermined time interval on the basis of the voltage detected by the voltage detecting unit, wherein the abnormality detecting unit may detect that the fuel cell system is abnormal when, after the suppression state is set, the voltage variation detected by the voltage variation detecting unit becomes larger than a first voltage variation determination value, which is larger than or equal to zero. By so doing, it is possible to accurately detect abnormality of the fuel cell system.

In addition, the fuel cell system may further include a voltage variation detecting unit that detects a voltage variation at a predetermined time interval on the basis of the voltage detected by the voltage detecting unit, wherein the abnormality detecting unit may detect that the fuel cell system is abnormal when, after the suppression state is set, the voltage variation detected by the voltage variation detecting unit becomes larger than a second voltage variation determination value, which is larger than or equal to zero, and the voltage detected by the voltage detecting unit becomes higher than a first voltage determination value, which is higher than or equal to zero. By so doing, it is possible to accurately detect abnormality of the fuel cell system.

In addition, the fuel cell system may further include a voltage variation detecting unit that detects a voltage variation at a predetermined time interval on the basis of the voltage detected by the voltage detecting unit, wherein the abnormality detecting unit may detect that the fuel cell system is abnormal when a period of time that elapses from when the suppression state is set to when the voltage variation detected by the voltage variation detecting unit becomes a third voltage variation determination value, which is larger than or equal to zero, is shorter than a first time determination value. By so doing, it is possible to accurately detect abnormality of the fuel cell system.

In addition, the fuel cell system may further include a voltage variation detecting unit that detects a voltage variation at a predetermined time interval on the basis of the voltage detected by the voltage detecting unit, wherein the abnormality detecting unit may detect that the fuel cell system is abnormal when, after the suppression state is set, the voltage variation detected by the voltage variation detecting unit becomes larger than a fourth voltage variation determination value, which is larger than or equal to zero, the voltage detected by the voltage detecting unit becomes higher than a second voltage determination value, which is higher than or equal to zero, and then the voltage decreases to become lower than a third voltage determination value, and when a period of time that elapses from when the voltage becomes higher than the second voltage determination value to when the voltage becomes lower than the third voltage determination value is shorter than a second time determination value. By so doing, it is possible to accurately detect abnormality of the fuel cell system.

In addition, the fuel cell system may further include a voltage variation detecting unit that detects a voltage variation at a predetermined time interval on the basis of the voltage detected by the voltage detecting unit, wherein the abnormality detecting unit may detect that the fuel cell system is abnormal when, after the suppression state is set, the voltage variation detected by the voltage variation detecting unit becomes larger than a fifth voltage variation determination value, which is larger than or equal to zero, and the voltage variation then becomes approximately zero and then the voltage detected by the voltage detecting unit becomes lower than a fourth voltage determination value, which is higher than or equal to zero, and when a period of time that elapses from when the voltage variation becomes larger than the fifth voltage variation determination value to when the voltage becomes smaller than the fourth voltage determination value is shorter than a third time determination value, which is longer than or equal to zero. By so doing, it is possible to accurately detect abnormality of the fuel cell system.

In addition, the fuel cell system may further include a voltage variation detecting unit that detects a voltage variation at a predetermined time interval on the basis of the voltage detected by the voltage detecting unit, wherein the abnormality detecting unit may detect that the fuel cell system is abnormal when, after the suppression state is set, the voltage variation detected by the voltage variation detecting unit becomes larger than a sixth voltage variation determination value, which is larger than or equal to zero, and then the voltage variation becomes approximately zero, and when a period of time that elapses from when the voltage variation becomes larger than the sixth voltage variation determination value to when the voltage variation becomes approximately zero is shorter than a fourth time determination value. By so doing, it is possible to accurately detect abnormality of the fuel cell system.

In addition, in the fuel cell system, the abnormality detecting unit may execute abnormality detection of the fuel cell system based on the variation in the voltage when the amount of the fuel gas in the anode-side passage is larger than a first amount determination value. By so doing, it is possible to suppress erroneous detection when the fuel cell system is abnormal.

In addition, in the fuel cell system, when the amount of the fuel gas in the anode-side passage is smaller than a second amount determination value, the abnormality detecting unit may detect that the fuel cell system is abnormal when a period of time that elapses from when the suppression state is set to when the voltage detected by the voltage detecting unit becomes lower than a fourth voltage determination value, which is higher than or equal to zero, is longer than a fifth time determination value. By so doing, it is possible to accurately detect abnormality of the fuel cell system.

In addition, in the fuel cell system, when the abnormality of the fuel cell is detected, the abnormality detecting unit may not use the variation in the voltage detected by the voltage detecting unit during a predetermined period of time after the suppression state is set. By so doing, it is possible to suppress erroneous detection when the fuel cell system is abnormal.

In addition, in the fuel cell system, after the normal power generation in the fuel cell is terminated and before the suppressing unit sets the suppression state, an electrical load may be connected to the fuel cell for at least a predetermined period of time. By so doing, it is possible to promptly make the voltage of the fuel cell enter a low voltage state.

In addition, in the fuel cell system, the suppressing unit may include an anode-side emission suppressing valve that is arranged in the anode-side passage and that suppresses emission of fuel gas, which has been subjected to electrochemical reaction, from the anode of the at least one fuel-cell cell to an outside of the fuel cell, wherein the suppression state may include a state where the anode-side emission suppressing valve is closed. By so doing, it is possible to set the suppression state.

In addition, in the fuel cell system, the suppressing unit may include an oxidation gas supply pump that is arranged in the cathode-side passage and that supplies oxidation gas to the cathode of the at least one fuel-cell cell, wherein the suppression state may include a state where the oxidation gas supply pump is stopped. By so doing, it is possible to set the suppression state.

In addition, in the fuel cell system, the suppressing unit may include a fuel gas shut-off valve that is arranged in the anode-side passage and that is able to shut off supply of the fuel gas to the anode of the at least one fuel-cell cell, wherein the suppression state may include a state where the fuel gas shut-off valve is closed. By so doing, it is possible to set the suppression state.

In addition, in the fuel cell system, the abnormality detecting unit may detect abnormality of the fuel cell in the fuel cell system on the basis of the variation in the voltage detected by the voltage detecting unit. By so doing, it is possible to suppress degradation of the fuel cell.

In addition, in the fuel cell system, the suppressing unit may include a cathode-side emission suppressing valve that is arranged in the cathode-side passage and that suppresses emission of oxidation gas, which has been subjected to electrochemical reaction, from the cathode of the at least one fuel-cell cell, to an outside of the fuel cell, wherein the suppression state may include a state where the cathode-side emission suppressing valve is closed. By so doing, it is possible to set the suppression state.

In addition, in the fuel cell system, the abnormality detecting unit may detect abnormality of the suppressing unit on the basis of the variation in the voltage detected by the voltage detecting unit. By so doing, it is possible to promptly solve the abnormality of the fuel cell system.

In addition, in the fuel cell system, the fuel cell may include a fuel cell stack formed of a plurality of the fuel-cell cells, the cathode-side passage may include an oxidation gas exhaust manifold that extends through the fuel cell stack in a stacking direction in which the fuel-cell cells are stacked and that collects and exhausts oxidation gas, which has been subjected to electrochemical reaction in the cathode of each of the fuel-cell cells, and an oxidation gas emission passage that is connected to the oxidation gas exhaust manifold on a side surface of the fuel cell stack and that emits the oxidation gas, exhausted from the oxidation gas exhaust manifold, to an outside of the cathode-side passage, the suppressing unit may include a cathode-side emission suppressing valve that is arranged in the oxidation gas emission passage and that suppresses emission of the oxidation gas to an outside of the fuel cell and a sealing portion that, in each fuel-cell cell, suppresses leakage of the oxidation gas from the cathode to an outside of the fuel-cell cell, the voltage detecting unit may measure voltages of fuel-cell cell groups, each of which is formed of one or more of the fuel-cell cells in the fuel cell stack, and the abnormality detecting unit may detect abnormality of the cathode-side emission suppressing valve or abnormality of the sealing portion on the basis of the voltages of the fuel-cell cell groups detected by the voltage detecting unit or the variations in the voltages. By so doing, it is possible to suppress degradation of the fuel cell.

In addition, in the fuel cell system, the abnormality detecting unit may detect that the cathode-side emission suppressing valve is abnormal when the voltage of the fuel-cell cell group adjacent to the side surface of the fuel cell stack becomes higher than the voltages of the other fuel-cell cells and becomes higher than a fifth voltage determination value. By so doing, it is possible to accurately detect abnormality of the cathode-side emission suppressing valve.

In addition, in the fuel cell system, when, among predetermined fuel-cell cell groups other than the fuel-cell cell group adjacent to the side surface of the fuel cell stack, a high-voltage fuel-cell cell group, of which the voltage becomes higher than that of the fuel-cell cell group adjacent to the side surface of the fuel cell stack, appears, and the voltage of the high-voltage fuel-cell cell group becomes higher than the sixth voltage determination value, the abnormality detecting unit may detect that the sealing portion in the high-voltage fuel-cell cell group is abnormal. By so doing, it is possible to accurately detect abnormality of the sealing portion in the high-voltage fuel-cell cell group.

In addition, in the fuel cell system, the abnormality detecting unit may include a notification unit that notifies the abnormality when the abnormality is detected. By so doing, it is possible to suppress degradation of the fuel cell.

Another aspect of the invention provides an abnormality detecting method for a fuel cell system. The fuel cell system includes at least one fuel-cell cell having an anode, a cathode and an electrolyte membrane, and includes a fuel cell connectable to an electrical load, an anode-side passage that supplies and exhausts fuel gas to and from the anode of the at least one fuel-cell cell, and a cathode-side passage that supplies and exhausts oxidation gas to and from the cathode of the at least one fuel-cell cell. The abnormality detecting method for the fuel cell system includes: a voltage detecting process of detecting a voltage of the fuel cell; a suppression state setting process of, in the fuel cell system, setting a suppression state where, after normal power generation in the fuel cell is terminated, connection between the electrical load and the fuel cell is interrupted, introduction of the fuel gas to the anode-side passage and introduction of the oxidation gas to the cathode-side passage are suppressed as compared with those during the normal power generation, and emission of the fuel gas from the anode-side passage to an outside of the anode-side passage and emission of the oxidation gas from the cathode-side passage to an outside of the cathode-side passage are suppressed as compared with those during the normal power generation; and an abnormality detecting process of, after the fuel cell system is set in the suppression state in the suppression state setting process, detecting abnormality of the fuel cell system on the basis of the voltage detected in the voltage detecting process or a variation in the voltage. With the abnormality detecting method for a fuel cell system, it is possible to suppress degradation of the fuel cell.

In addition, in the abnormality detecting process for a fuel cell system, the voltage detecting process may include a voltage variation detecting process of detecting a voltage variation at a predetermined time interval on the basis of the voltage, and the abnormality detecting process may include a process of detecting that the fuel cell system is abnormal when, after the suppression state is set, the voltage variation detected in the voltage variation detecting process becomes larger than a first voltage variation determination value, which is larger than or equal to zero. By so doing, it is possible to accurately detect abnormality of the fuel cell system.

In addition, in the abnormality detecting method for a fuel cell system, the voltage detecting process may include a voltage variation detecting process of detecting a voltage variation at a predetermined time interval on the basis of the voltage, and the abnormality detecting process may include a process of detecting that the fuel cell system is abnormal when, after the suppression state is set, the voltage variation detected in the voltage variation detecting process becomes larger than a second voltage variation determination value, which is larger than or equal to zero, and the voltage detected in the voltage detecting process becomes higher than a first voltage determination value, which is higher than or equal to zero. By so doing, it is possible to accurately detect abnormality of the fuel cell system.

In addition, in the abnormality detecting method for a fuel cell system, the voltage detecting process may include a voltage variation detecting process of detecting a voltage variation at a predetermined time interval on the basis of the voltage, and the abnormality detecting process may include a process of detecting that the fuel cell system is abnormal when, after the suppression state is set, a period of time that elapses until the voltage variation detected in the voltage variation detecting process becomes a third voltage variation determination value, which is larger than or equal to zero, is shorter than a first time determination value. By so doing, it is possible to accurately detect abnormality of the fuel cell system.

In addition, in the abnormality detecting method for a fuel cell system, the abnormality detecting process may include a process of detecting abnormality of the fuel cell in the fuel cell system on the basis of the variation in the voltage detected in the voltage detecting process. By so doing, it is possible to suppress degradation of the fuel cell.

In addition, in the abnormality detecting method for a fuel cell system, the abnormality detecting process may include a process of detecting abnormality of the suppressing unit on the basis of the variation in the voltage detected in the voltage detecting process. By so doing, it is possible to promptly solve the abnormality of the fuel cell system.

In addition, in the abnormality detecting method for a fuel cell system, the fuel cell includes a fuel cell stack formed of a plurality of the fuel-cell cells, the cathode-side passage may include an oxidation gas exhaust manifold that extends through the fuel cell stack in a stacking direction in which the fuel-cell cells are stacked and that collects and exhausts oxidation gas, which has been subjected to electrochemical reaction in the cathode of each of the fuel-cell cells, and an oxidation gas emission passage that is connected to the oxidation gas exhaust manifold on a side surface of the fuel cell stack and that emits the oxidation gas, exhausted from the oxidation gas exhaust manifold, to an outside of the cathode-side passage, the suppressing unit may include a cathode-side emission suppressing valve that is arranged in the oxidation gas emission passage and that suppresses emission of the oxidation gas to an outside of the fuel cell and a sealing portion that, in each fuel-cell cell, suppresses leakage of the oxidation gas from the cathode to an outside of the fuel-cell cell, the voltage detecting process may include a process of measuring voltages of fuel-cell cell groups, each of which is formed of one or more of the fuel-cell cells, in the fuel cell stack, and the abnormality detecting process may include a process of detecting abnormality of the cathode-side emission suppressing valve or abnormality of the sealing portion on the basis of the voltages of the fuel-cell cell groups detected in the voltage detecting process or the variations in the detected voltages. By so doing, it is possible to accurately detect abnormality of the cathode-side emission suppressing valve.

Note that the aspect of the invention is not limited to the above described fuel cell system; the aspect of the invention may be implemented in an embodiment of another apparatus invention, such as an abnormality detecting apparatus. In addition, the aspect of the invention is not limited to the above abnormality detecting method for a fuel cell system; the aspect of the invention may be implemented in an embodiment of another method invention, such as an abnormality detecting method. In addition, the aspect of the invention may be implemented in various embodiments, such as an embodiment as a computer program for constructing those method and apparatus, an embodiment as a recording medium in which the computer program is recorded, and a data signal including the computer program and implemented in a carrier wave.

In addition, when the aspect of the invention is implemented as a computer program, a recording medium in which the computer program is recorded, or the like, it may be implemented as the entire program that controls operations of the apparatus or may be implemented as only part of the program that achieves the function of the invention.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 9 is a flowchart that shows an abnormality detecting process executed by a fuel cell system according to a fourth embodiment of the invention;

DETAILED DESCRIPTION OF EMBODIMENTS

Figure 1:
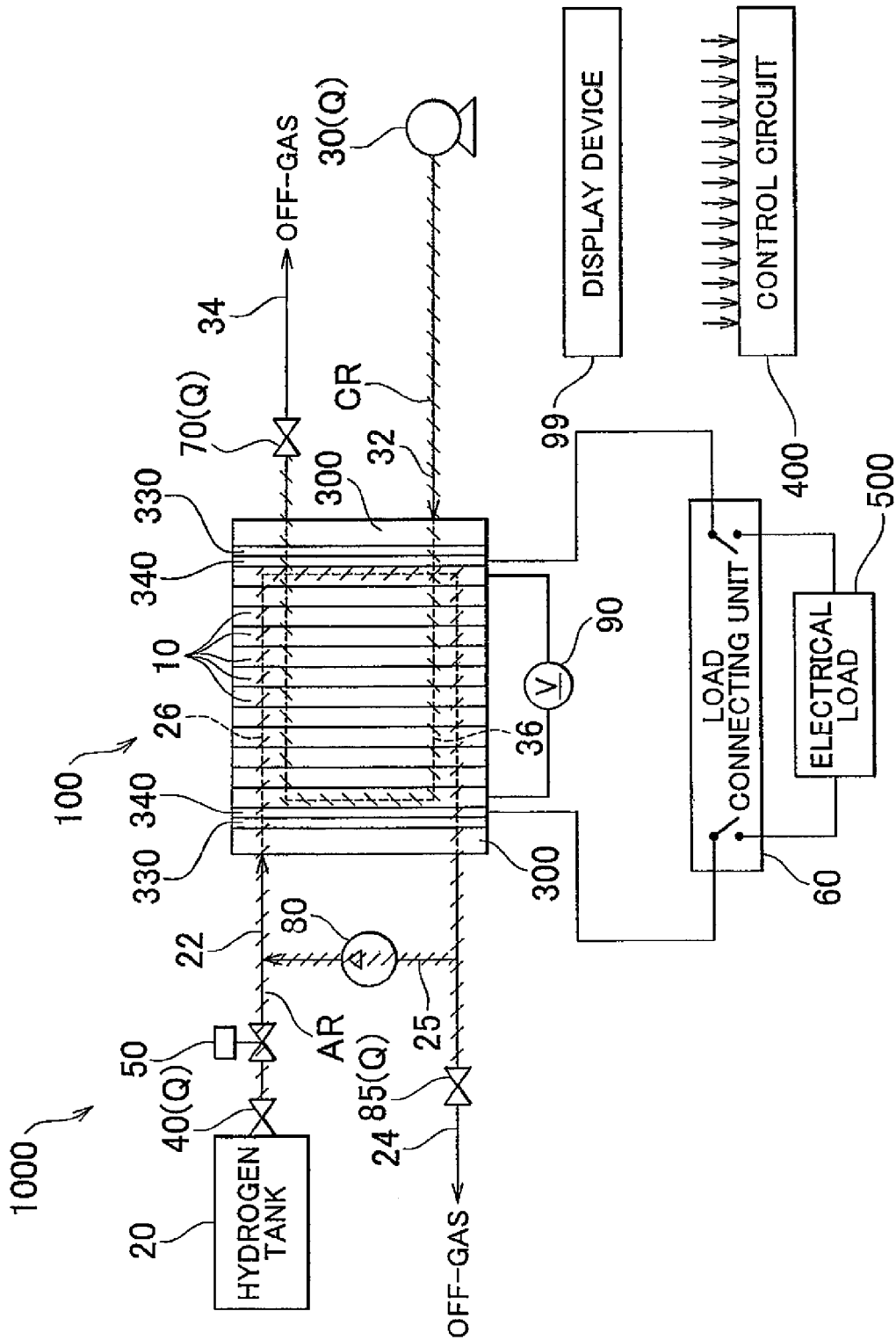
FIG. 1 is a block diagram that shows the configuration of a fuel cell system according to a first embodiment of the invention.

Hereinafter, embodiments of the invention will be described with reference to the accompanying drawings. First, a first embodiment will be described. FIG. 1 is a block diagram that shows the configuration of a fuel cell system 1000 according to the first embodiment of the invention. The fuel cell system 1000 according to the present embodiment includes a suppressing unit Q and sets a suppression state. The suppressing unit Q and the suppression state will be described later. The fuel cell system 1000 according to the present embodiment mainly includes a hydrogen tank 20, a compressor 30, a hydrogen shut-off valve 40, a variable pressure regulating valve 50, a load connecting unit 60, a cathode sealing valve 70, a circulating pump 80, a purge valve 85, a voltage sensor 90, a display device 99, a fuel cell 100, and a control circuit 400.

The hydrogen tank 20 is a storage device that stores high-pressure hydrogen gas as fuel gas. The hydrogen tank 20 is connected to the fuel cell 100 (a hydrogen supply manifold, which will be described later) via a hydrogen supply passage 22. A hydrogen shut-off valve 40 and a variable pressure regulating valve 50 are provided in the hydrogen supply passage 22 in the stated order from the one adjacent to the hydrogen tank 20. The variable pressure regulating valve 50 is a pressure regulating valve that is able to adjust hydrogen pressure (amount of hydrogen) supplied from the hydrogen tank 20 to the fuel cell 100.

The fuel cell 100 (hydrogen exhaust manifold, which will be described later) is connected to a hydrogen exhaust passage 24. The purge valve 85 is provided in the hydrogen exhaust passage 24. The hydrogen exhaust passage 24 is connected to a hydrogen circulation passage 25 between the purge valve 85 and the fuel cell 100. An end of the hydrogen circulation passage 25, opposite to an end connected to the hydrogen exhaust passage 24, is connected to the hydrogen supply passage 22 between the variable pressure regulating valve 50 and the fuel cell 100. The circulating pump 80 is arranged in the hydrogen circulation passage 25.

Hydrogen supplied from the hydrogen tank 20 via the hydrogen supply passage 22 is subjected to electrochemical reaction in the fuel cell 100 and is exhausted to the hydrogen exhaust passage 24. Hydrogen exhausted to the hydrogen exhaust passage 24 is introduced again to the fuel cell 100 via the hydrogen circulation passage 25 and the hydrogen supply passage 22 by operation of the circulating pump 80. In this way, hydrogen exhausted from the fuel cell 100 circulates in a passage (anode passage 26, which will be described later) formed of part of the hydrogen exhaust passage 24, the hydrogen circulation passage 25, part of the hydrogen supply passage 22 and the fuel cell 100. Note that the control circuit 400, which will be described later, opens the purge valve 85 during power generation; however, the control circuit 400 appropriately opens the purge valve 85 as impurities (nitrogen, or the like) contained in circulating hydrogen increase, thus exhausting the impurities to the outside of the fuel cell system 1000 via the hydrogen exhaust passage 24.

The compressor 30 supplies air, which serves as oxidation gas, to the fuel cell 100. The compressor 30 is connected to the fuel cell 100 (air supply manifold, which will be described later) via an air supply passage 32. The compressor 30 provides a large pressure loss when it is stopped. Thus, when the compressor 30 is stopped, flow of air to the air supply passage 32 via the compressor 30 is suppressed.

In addition, the fuel cell 100 (air exhaust manifold, which will be described later) is connected to the air exhaust passage 34. Air supplied from the compressor 30 via the air supply passage 32 is subjected to electrochemical reaction in the fuel cell 100, and is exhausted to the outside of the fuel cell 100 via the air exhaust passage 34.

The cathode sealing valve 70 is arranged in the air exhaust passage 34. The cathode sealing valve 70 suppresses flow of air into the fuel cell 100 via the air exhaust passage 34 after normal power generation of the fuel cell 100 is terminated. The details of "normal power generation" will be described later.

The fuel cell 100 is a solid polymer fuel cell, and includes a plurality of fuel-cell cells 10, end plates 300, insulators 330, and terminals 340. The fuel-cell cells 10 are clamped by the two end plates 300 via the insulators 330 and the terminals 340. That is, the fuel cell 100 has a stacked structure such that the plurality of fuel-cell cells 10 are stacked. In addition, the fuel cell 100 has such a structure that a tension plate (not shown) is connected to each end plate 300 by bolts (not shown) to fasten the fuel-cell cells 10 with a predetermined force in a stacking direction in which the fuel-cell cells 10 are stacked.

Figure 2:
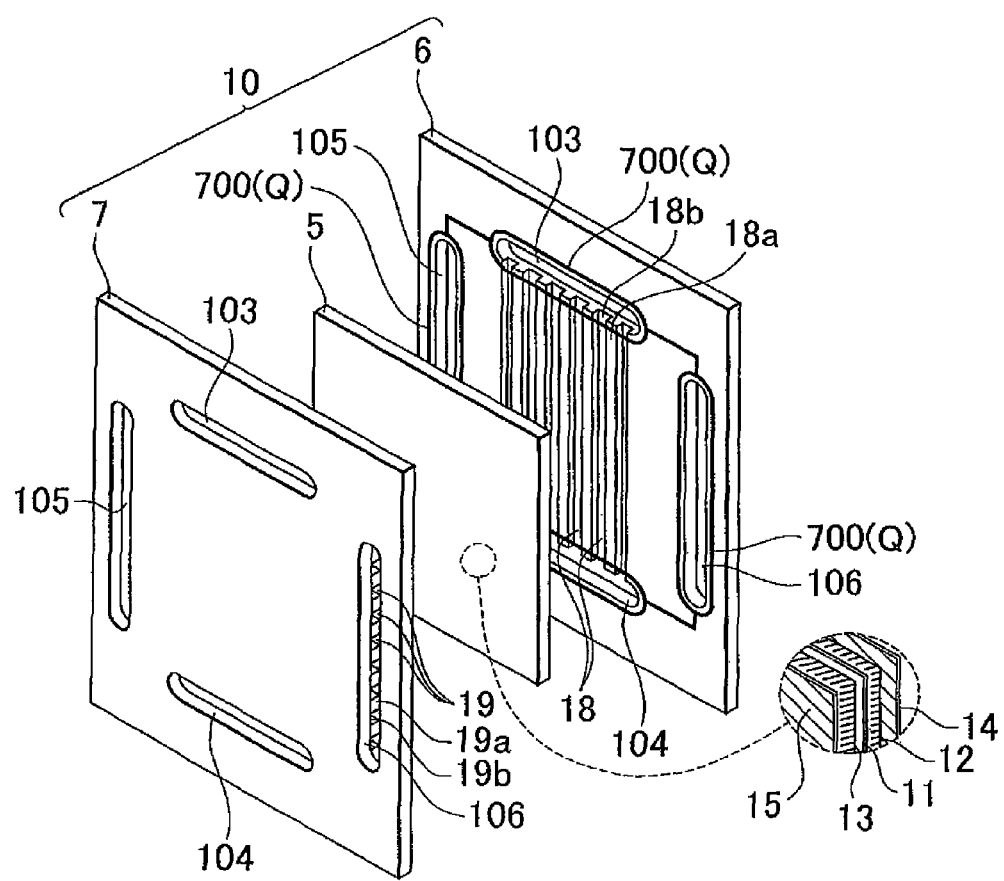
FIG. 2 is a schematic cross-sectional view that shows the schematic configuration of a fuel-cell cell shown in FIG. 1.

FIG. 2 is a schematic cross-sectional view that shows the schematic configuration of each fuel-cell cell 10. Each of the fuel-cell cells 10 includes a membrane electrode assembly (MEA) 5. The MEA 5 includes an electrolyte membrane 11, a cathode 12, an anode 13, a gas diffusion layer 14, and a gas diffusion layer 15. The cathode 12 and the anode 13 are arranged respectively on both sides of the electrolyte membrane 11. The gas diffusion layer 14 is arranged on an outer surface of the cathode 12. The gas diffusion layer 15 is arranged on an outer surface of the anode 13. The electrolyte membrane 11 is a solid polymeric material, such as a proton conducting ion exchange membrane made of fluororesin. The electrolyte membrane 11 exhibits desirable proton conductivity in a wet state. The cathode 12 and the anode 13 each are formed of carbon (hereinafter, referred to as platinum-supported carbon) that supports platinum (Pt), which is a catalytic metal, and an electrolyte. Each of the gas diffusion layers 14 and 15 is a conductive carbon porous member, and is, for example, formed of carbon cloth or carbon paper.

Separators 6 and 7 may be formed of a gas-impermeable conductive member, such as dense carbon that is formed by compressing carbon to have gas impermeability or a pressed metal plate. The separator 6 has an uneven shape on its one side. In the uneven shape, protrusions 18a and recesses 18b are alternately formed. Then, in the separator 6, the protrusions 18a press the gas diffusion layer 14 (the cathode 12 or the electrolyte membrane 11), and the recesses 18b form intra-cell air passages 18 between the recesses 18b and the gas diffusion layer 14 for supplying and exhausting oxidation gas to and from the gas diffusion layer 14 (cathode 12). In addition, the separator 7 has an uneven shape on one side. In the uneven shape, protrusions 19a and recesses 19b are alternately formed. In the separator 7, the protrusions 19a press the gas diffusion layer 15 (the anode 13 or the electrolyte membrane 11), and the recesses 19b form intra-cell hydrogen passages 19 between the recesses 19b and the gas diffusion layer 15 for supplying and exhausting fuel gas to and from the gas diffusion layer 15 (anode 13).

The separators 6 and 7 each have holes 103 to 106 at portions corresponding to each other near the outer peripheries thereof. When the separators 6 and 7 are stacked together with the MEA 5 and the gas diffusion layers 14 and 15 to assemble the fuel cell 100, the holes provided at the corresponding portions of the stacked separators 6 and 7 overlap each other to form flow passages that extend through the inside of the fuel cell 100 in the stacking direction. Specifically, the holes 103 form an oxidation gas supply manifold, the holes 104 forms an oxidation gas exhaust manifold, the holes 105 form a fuel gas supply manifold, and the holes 106 form a fuel gas exhaust manifold. The oxidation gas supply manifold is a passage for introducing oxidation gas into the intra-cell air passages 18. The oxidation gas exhaust manifold is a passage for exhausting oxidation gas from the intra-cell air passages 18. The fuel gas supply manifold is a passage for introducing fuel gas into the intra-cell hydrogen passages 19. The fuel gas exhaust manifold is a passage for exhausting fuel gas from the intra-cell hydrogen passage 19.

The intra-cell air passages 18, the intra-cell hydrogen passages 19 and seal members 700 for securing gas sealing performance in the above described manifolds are provided for the fuel-cell cell 10.

In the fuel cell 100, passages through which hydrogen flows during power generation, that is, the gas diffusion layer 15, intra-cell hydrogen passages 19, hydrogen supply manifold and hydrogen exhaust manifold of each fuel-cell cell 10, are also collectively referred to as the anode passage 26. In addition, in the fuel cell 100, passages through which air flows during power generation, that is, the gas diffusion layer 14, intra-cell air passages 18, air supply manifold and air exhaust manifold of each fuel-cell cell 10, are also collectively referred to as a cathode passage 36. Furthermore, in the hydrogen supply passage 22, anode passage 26 and hydrogen exhaust passage 24, passages between the purge valve 85 and the fuel cell 100 and the hydrogen circulation passage 25 are also collectively referred to as an anode-side passage AR. In the air supply passage 32, cathode passage 36 and air exhaust passage 34, passages between the cathode sealing valve 70 and the fuel cell 100 are also collectively referred to as a cathode-side passage CR.

The load connecting unit 60 is connected to each of the terminals 340 of the fuel cell 100. In addition, the load connecting unit 60 is able to switch connection between the fuel cell 100 (terminals 340) and an electrical load 500 outside the fuel cell system 1000. The load connecting unit 60 connects the fuel cell 100 to the electrical load 500 during normal power generation. Note that the electrical load 500 is, for example, a secondary battery, an electric power consuming device (motor, or the like), or the like.

The voltage sensor 90 detects a fuel cell voltage Vf of the fuel cell 100. The display device 99 notifies abnormality through display when the fuel cell system 1000 is determined to be abnormal in an abnormality detecting process, which will be described later.

In addition, the fuel cell system 1000 according to the present embodiment includes a cooling equipment (not shown) formed of a radiator (not shown), or the like. Refrigerant flows from the cooling equipment to a refrigerant passage (not shown) provided between the adjacent fuel-cell cells 10 in the fuel cell 100 to adjust the internal temperature of the fuel cell 100.

The control circuit 400 is formed of a logic circuit that predominantly includes a microcomputer. More specifically, the control circuit 400 includes a CPU (not shown), a ROM (not shown), a RAM (not shown), an input/output port (not shown), and the like. The CPU executes predetermined processing, or the like, in accordance with a predetermined control program. The ROM prestores control programs, control data, and the like, necessary for executing various processings in the CPU. Similarly, various data necessary for various processings in the CPU are temporarily read from or written into the RAM. The input/output port inputs or outputs various signals. The control circuit 400 is connected to the compressor 30, the hydrogen shut-off valve 40, the variable pressure regulating valve 50, the load connecting unit 60, the cathode sealing valve 70, the circulating pump 80, the purge valve 85 and the display device 99 via a telecommunication line to execute various controls over these components. The RAM of the control circuit 400 stores an abnormality detecting flag used in the abnormality detecting process, which will be described later. In addition, the control circuit 400 has a timer function by which the duration of a predetermined period may be measured.

The control circuit 400 operates the fuel cell 100 for normal power generation in the fuel cell system 1000 when an electric power request is received from the outside of the fuel cell system 1000. Specifically, as the control circuit 400 receives an electric power request from the outside of the fuel cell system 1000, the control circuit 400 controls the load connecting unit 60 to connect the fuel cell 100 to the electrical load 500. Then, the control circuit 400 opens the hydrogen shut-off valve 40, adjusts the variable pressure regulating valve 50 in accordance with the magnitude of electric power required, and then drives the compressor 30 and opens the cathode sealing valve 70. Note that the control circuit 400 warms up the fuel cell 100 for a predetermined period when normal power generation operation is started.

On the other hand, as the control circuit 400 receives an operation stop request (a stop request for normal power generation of the fuel cell 100) in the fuel cell system 1000, the control circuit 400 executes normal power generation termination process for terminating normal power generation operation. Specifically, as the control circuit 400 receives an operation stop request, the control circuit 400 closes the hydrogen shut-off valve 40 and stops the circulating pump 80 and the compressor 30 to stop supply of hydrogen (fuel gas) and air (oxidation gas) to the fuel cell 100. In addition, during the above normal power generation termination process, the control circuit 400 controls the load connecting unit 60 to interrupt connection between the fuel cell 100 and the electrical load 500.

After that, the control circuit 400 closes the cathode sealing valve 70. In accordance with this, in the fuel cell system 1000, introduction and emission of hydrogen to and from the anode-side passage AR are suppressed, and introduction and emission of air to and from the cathode-side passage CR are suppressed (hereinafter, also referred to as suppression state). In this case, at least the hydrogen shut-off valve 40, the cathode sealing valve 70, the compressor 30, the purge valve 85 and the seal members 700 of the fuel-cell cells 10 function as a suppressing unit Q that sets the suppression state. It is only necessary that the suppressing unit Q at least includes any one of the hydrogen shut-off valve 40, the cathode sealing valve 70, the compressor 30, the purge valve 85 and the seal members 700 of the fuel-cell cells 10. The suppression state continues until the fuel cell 100 starts the next normal power generation operation.

Figure 3A:
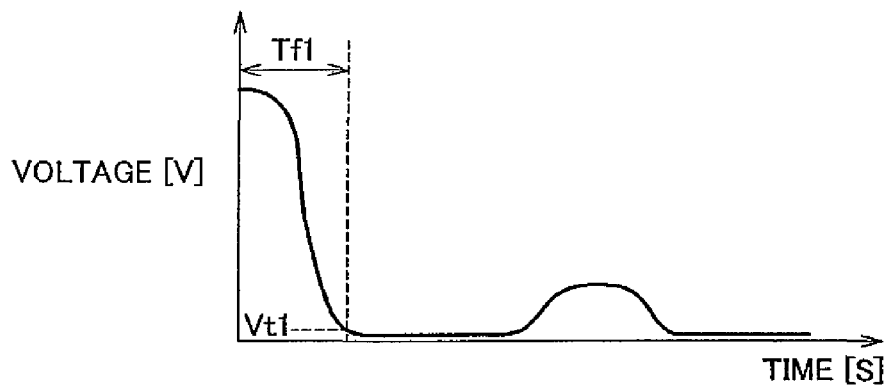
FIG. 3A to FIG. 3C are graphs that illustrate examples of progression of voltage of the fuel cell after a suppression state is set according to the first embodiment.
Figure 3B:
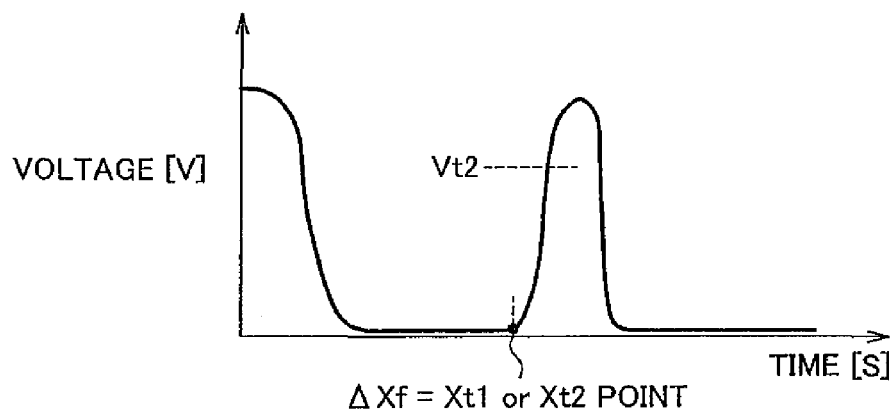
Figure 3C:
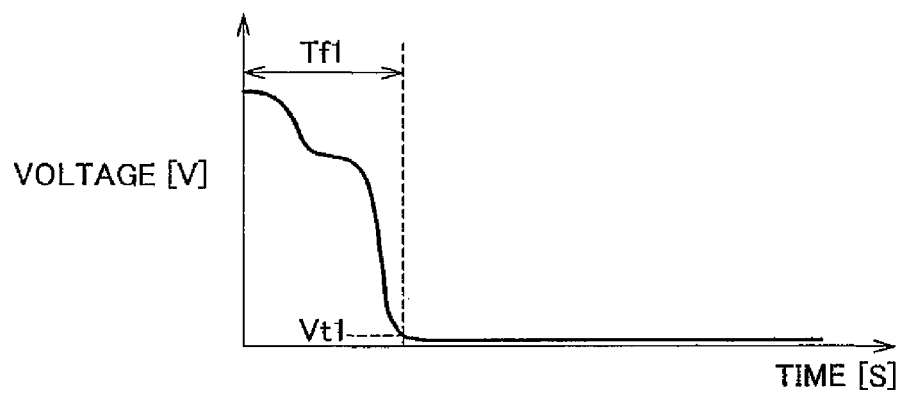

FIG. 3A to FIG. 3C are graphs that illustrate examples of progression of voltage of the fuel cell 100 after the suppression state is set. Specifically, FIG. 3A shows an example of progression of voltage after the suppression state is set when the fuel cell 100 (the fuel-cell cells 10) is normal. FIG. 3B shows an example of progression of voltage after the suppression state is set when the fuel cell 100 (the fuel-cell cells 10) is abnormal in a state where the amount of hydrogen in the anode-side passage AR is relatively large. FIG. 3C shows an example of progression of voltage after the suppression state is set when the fuel cell 100 (the fuel-cell cells 10) is abnormal in a state where the amount of hydrogen in the anode-side passage AR is relatively small.

In the fuel cell system 1000 according to the present embodiment, when the suppression state is set, hydrogen remains at the anode side and oxygen remains at the cathode side, so the voltage of the fuel cell 100 (fuel-cell cells 10) is high to some extent. Then, in the fuel cell system 1000, after the suppression state is set, in each of the fuel-cell cells 10, hydrogen at the anode side leaks to the cathode side via the electrolyte membrane 11, and undergoes catalytic reaction with air (oxygen) at the cathode side in the cathode 12 to be consumed. In addition, oxygen at the cathode side leaks and diffuses to the anode side via the electrolyte membrane 11. In accordance with these, oxygen at the cathode side reduces, and, as shown in FIG. 3A and FIG. 3B, the voltage of the fuel cell 100 (fuel-cell cells 10) starts to gradually decrease after the suppression state is set.

When the amount of hydrogen in the anode-side passage AR is relatively large, catalytic reaction between hydrogen and oxygen actively occurs in the cathode 12 because of leakage of hydrogen. Thus, the amount of oxygen in the cathode-side passage CR reduces, and the voltage of the fuel cell 100 (fuel-cell cells 10) gradually decreases after the suppression state is set, and then enters a low voltage state (for example, approximately 0 V).

When the amount of hydrogen in the anode-side passage AR is relatively large, and when the suppressing unit Q is normally functioning so that the suppression state is maintained, flow of oxygen to the cathode 12 of each fuel-cell cell 10 is suppressed, and an increase in voltage of the fuel cell 100 (fuel-cell cells 10) is suppressed. Thus, in this case, after the voltage of the fuel cell 100 enters a low voltage state, a variation (increase) in voltage is small and the voltage remains in a low voltage state. This suppresses occurrence of partial oxidation reaction (carbon oxidation reaction) in the cathode 12. As a result, the fuel cell 100 is maintained in a normal state. In other words, as shown in FIG. 3A, when the amount of hydrogen in the anode-side passage AR is relatively large, and when a variation in voltage is relatively small after the voltage of the fuel cell 100 enters a low voltage state, it may be estimated that the fuel cell 100 is normal and, in addition, the suppressing unit Q is normally functioning.

When the amount of hydrogen in the anode-side passage AR is relatively large, and when abnormality occurs in the suppressing unit Q and, as a result, the suppression state cannot be maintained, the voltage of the fuel cell 100 enters a low voltage state because the amount of oxygen initially reduces due to catalytic reaction in the cathode 12, so the low voltage state is temporarily maintained. However, because oxygen flows into the cathode 12 of each fuel-cell cell 10, the voltage of the fuel cell 100 may rapidly increase again to enter a high voltage state. In accordance with this, there is a possibility that partial oxidation reaction (carbon oxidation reaction) occurs in the cathode 12 during a high voltage state, that is, there is a possibility that the fuel cell 100 enters an abnormal state. In other words, as shown in FIG. 3B, when the amount of hydrogen in the anode-side passage AR is relatively large, and the voltage of the fuel cell 100 rapidly increases after the voltage enters a low voltage state, it may be estimated that the fuel cell 100 is abnormal and, in addition, abnormality has been occurring in the suppressing unit Q. Note that when the voltage of the fuel cell 100 rapidly increases after the voltage enters a low voltage state, the voltage decreases again because of various factors. It may be considered that the factors that cause the voltage to decrease again is, for example, such that oxygen that flows into the cathodes 12 diffuses to the anodes 13 to reduce the amount of oxygen in the cathodes 12.

In addition, when the amount of hydrogen in the anode-side passage AR is relatively small, and when the suppressing unit Q is normally functioning and, as a result, the suppression state is maintained, flow of oxygen to the cathode 12 of each fuel-cell cell 10 is suppressed. Thus, the amount of oxygen reduces due to catalytic reaction in the cathode 12, the voltage of the fuel cell 100 (fuel-cell cells 10) smoothly decreases after the suppression state is set and then enters a low voltage state for a relatively short period of time. Thus, the high voltage state just remains for a relatively short period of time, so occurrence of partial oxidation reaction (carbon oxidation reaction) in the cathode 12 is suppressed. As a result, the fuel cell 100 is maintained in a normal state. In other words, when the amount of hydrogen in the anode-side passage AR is relatively low, and when, as shown in FIG. 3A, the duration from when the suppression state is set to when the voltage of the fuel cell 100 enters a low voltage state is relatively short, it may be estimated that the fuel cell 100 is normal and, in addition, the suppressing unit Q is normally functioning.

On the other hand, when the amount of hydrogen in the anode-side passage AR is relatively small, and when abnormality occurs in the suppressing unit Q and, therefore, the suppression state cannot be maintained, the voltage of the fuel cell 100 may possibly exhibit the following behavior. That is, after the suppression state is set, catalytic reaction between hydrogen and oxygen in the cathodes 12 decreases, and oxygen gradually flows into the cathode 12 of each fuel-cell cell 10. Thus, there is a possibility that a decrease in voltage slows before entering a low voltage state or a slight increase in voltage occurs before entering a low voltage state and, therefore, the high voltage state continues for a relatively long period of time. As a result, partial oxidation reaction (carbon oxidation reaction) may occur in the cathode 12 during a high voltage state, and the fuel cell 100 may enter an abnormal state. In other words, as shown in FIG. 3C, when the amount of hydrogen in the anode-side passage AR is relatively small, and when the duration until the voltage of the fuel cell 100 enters a low voltage state is long, it may be estimated that the fuel cell 100 is abnormal and, in addition, abnormality has been occurring in the suppressing unit Q.

In consideration of the above idea, in the fuel cell system 1000 according to the present embodiment, the control circuit 400 executes abnormality detecting process for detecting abnormality of the fuel cell system 1000 (specifically, the suppressing unit Q or the fuel cell 100) on the basis of a variation in voltage of the fuel cell 100. The abnormality detecting process is executed at the time when the suppression state is set by the suppressing unit Q after normal power generation is terminated.

Figure 4:
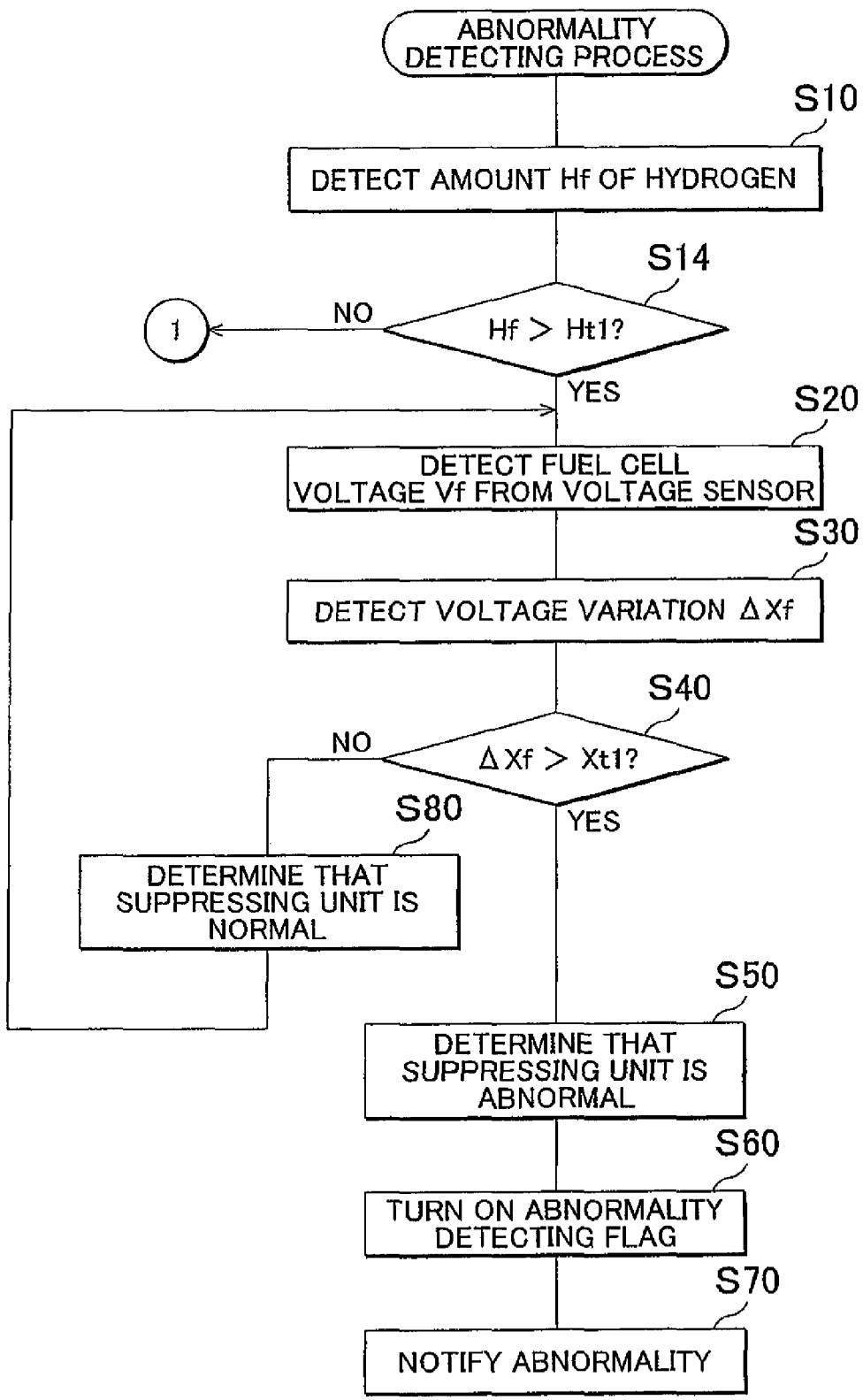
FIG. 4 is a flowchart that shows an abnormality detecting process executed by the fuel cell system according to the first embodiment.
Figure 5:
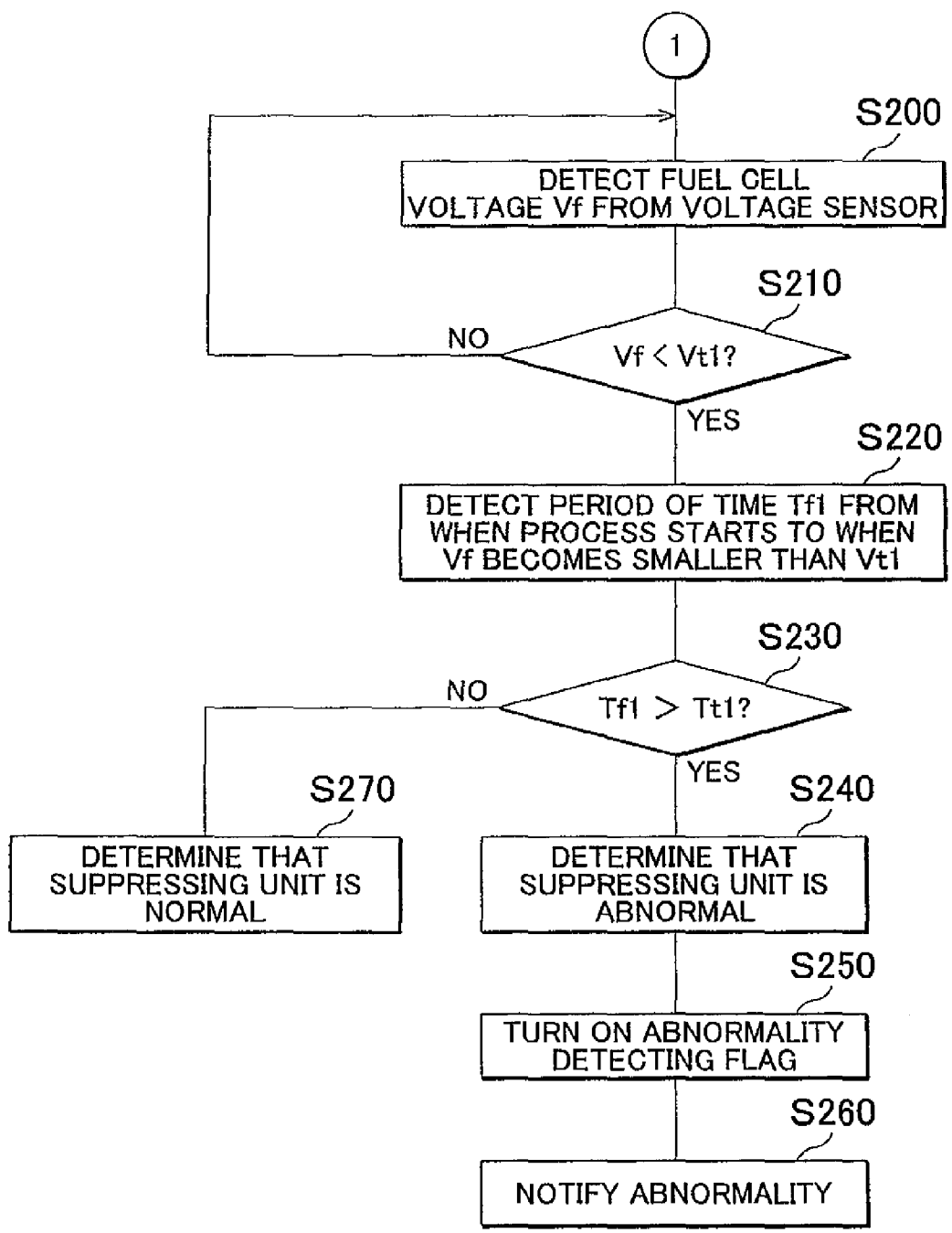
FIG. 5 is a flowchart that shows the abnormality detecting process executed by the fuel cell system according to the first embodiment.

FIG. 4 and FIG. 5 are flowcharts that show the abnormality detecting process executed by the fuel cell system 1000 according to the present embodiment. The abnormality detecting process is continuously executed until an electric power request is received again from the outside of the fuel cell system 1000, that is, until the next normal power generation operation of the fuel cell 100 is started. Before the abnormality detecting process, the abnormality detecting flag stored in the RAM is in an off state.

In the abnormality detecting process, the control circuit 400 first detects the amount Hf of hydrogen that remains in the anode-side passage AR (step S10 in FIG. 4). Specifically, before normal power generation is terminated, the control circuit 400 detects the amount Hf of hydrogen that remains in the anode-side passage AR on the basis of the amount of hydrogen supplied to the fuel cell 100 by controlling the variable pressure regulating valve 50 and the amount of power generated by the fuel cell 100.

The control circuit 400 determines whether the amount Hf of hydrogen is larger than a threshold Ht1 (step S14).

When the amount Hf of hydrogen is larger than the threshold Ht1 (that is, the amount Hf of hydrogen is relatively large) (Yes in step S14), the control circuit 400 subsequently detects the fuel cell voltage Vf from the voltage sensor 90 (step S20). In this case, the control circuit 400 stores the detected fuel cell voltage Vf each time the fuel cell voltage Vf is detected.

The control circuit 400 detects (calculates) a voltage variation ΔXf that indicates a variation in fuel cell voltage per unit time (step S30). Specifically, the control circuit 400 calculates a minute interval voltage variation ΔVf that is obtained by subtracting the previously detected fuel cell voltage Vf from the currently detected fuel cell voltage Vf. Then, the control circuit 400 divides the minute interval voltage variation ΔVf by a period of time ΔT that elapses from when the fuel cell voltage Vf is previously detected to when the fuel cell voltage Vf is currently detected to thereby calculate the voltage variation ΔXf.

The control circuit 400 determines whether the voltage variation ΔXf is larger than a threshold Xt1 (see FIG. 3A and FIG. 3B) (step S40). When the voltage variation ΔXf is larger than the threshold Xt1 (Yes in step S40), it may be presumed that the voltage of the fuel cell 100 has entered a low voltage state and then the voltage has steeply increased, so the control circuit 400 determines (detects) that, in the fuel cell system 1000, the fuel cell 100 is abnormal and, as a factor of the abnormality, abnormality has been occurring in the suppressing unit Q (step S50).

When the control circuit 400 determines (detects) that the fuel cell 100 is abnormal and abnormality has been occurring in the suppressing unit Q, the control circuit 400 turns on the abnormality detecting flag stored in the RAM (step S60).

Then, the control circuit 400 indicates (notifies), on the display device 99, that the fuel cell 100 is abnormal and abnormality has been occurring in the suppressing unit Q (step S70).

When the voltage variation ΔXf is smaller than or equal to the threshold Xt1 (No in step S40), the control circuit 400 determines (detects) that the fuel cell 100 is maintained in a low voltage state, the fuel cell 100 is normal and the suppressing unit Q is normally functioning (step S80). After the control circuit 400 determines (detects) that the suppressing unit Q is normally functioning, the process returns to step S20.

The period of time ΔT that elapses from when the control circuit 400 detects the fuel cell voltage Vf in step S20 to when the process returns to step S20 again after the process of step S80 and then the control circuit 400 detects the fuel cell voltage Vf, the threshold Ht1 and the threshold Xt1 are appropriately determined on the basis of a specific design, or the like, of the fuel cell system 1000 according to the present embodiment.

On the other hand, when the amount Hf of hydrogen is smaller than or equal to the threshold Ht1 (that is, the amount Hf of hydrogen is relatively small) (No in step S14 in FIG. 4), the control circuit 400 first detects the fuel cell voltage Vf from the voltage sensor 90 (step S200 in FIG. 5).

The control circuit 400 determines whether the detected fuel cell voltage Vf is smaller than the threshold Vt1 (step S210).

When the detected fuel cell voltage Vf is larger than or equal to the threshold Vt1 (No in step S210), the control circuit 400 determines that the voltage of the fuel cell 100 has not yet entered a low voltage state, and then the process returns to step S200.

When the detected fuel cell voltage Vf is smaller than the threshold Vt1 (Yes in step S210), the control circuit 400 determines that the voltage of the fuel cell 100 has entered a low voltage state, and then detects a period of time Tf1 that elapses from when the abnormality detecting process is started, that is, from when the suppression state is set by the suppressing unit Q, to when the fuel cell voltage Vf becomes smaller than the threshold Vt1 (step S220).

The control circuit 400 determines whether the period of time Tf1 is longer than a threshold Tt1 (step S230).

When the period of time Tf1 is longer than the threshold Tt1 (Yes in step S230), the control circuit 400 determines that the high voltage state has continued for a relatively long period of time since the suppression state was set, and determines (detects) that, in the fuel cell system 1000, the fuel cell 100 is abnormal and, as a factor of the abnormality, abnormality has been occurring in the suppressing unit Q (step S240).

When the control circuit 400 determines (detects) that the fuel cell 100 is abnormal and abnormality has been occurring in the suppressing unit Q, the control circuit 400 turns on the abnormality detecting flag stored in the RAM (step S250).

Then, the control circuit 400 indicates (notifies), on the display device 99, that the fuel cell 100 is abnormal and abnormality has been occurring in the suppressing unit Q (step S260).

When the period of time Tf1 is shorter than or equal to the threshold Tt1 (No in step S230), it may be presumed that the high voltage state has continued for a relatively short period of time since the suppression state was set, so the control circuit 400 determines (detects) that the fuel cell 100 is normal and the suppressing unit Q is normally functioning (step S270).

The threshold Vt1 and the threshold Tt1 are larger than or equal to zero, and are appropriately determined on the basis of a specific design, or the like, of the fuel cell system 1000 according to the present embodiment.

As described above, the fuel cell system 1000 according to the present embodiment, in the abnormality detecting process, detects the fuel cell voltage Vf after the suppression state is set by the suppressing unit Q, and then detects whether the fuel cell 100 in the fuel cell system 1000 or the suppressing unit Q is normal or abnormal on the basis of a variation in fuel cell voltage Vf (see the process in step S40 in FIG. 4). By so doing, when the fuel cell 100 is abnormal and abnormality has been occurring in the suppressing unit Q, it is possible to prevent leaving the abnormality, and it is possible to suppress occurrence of partial oxidation reaction in the cathode 12 of the fuel cell 100. As a result, it is possible to suppress degradation of the fuel cell 100.

The fuel cell system 1000 according to the present embodiment, in the abnormality detecting process, determines (detects) that the fuel cell 100 is abnormal and abnormality has been occurring in the suppressing unit Q when the amount Hf of hydrogen is larger than the threshold Ht1 (that is, when the amount Hf of hydrogen is relatively large) and when the voltage variation ΔXf is larger than the threshold Xt1. By so doing, it is possible to accurately detect a steep increase in voltage after the voltage of the fuel cell 100 enters a low voltage state with an increase in voltage variation ΔXf. Thus, it is possible to accurately detect abnormality of the fuel cell 100 or abnormality of the suppressing unit Q. In accordance with this, it is possible to prevent leaving a situation that the fuel cell 100 is abnormal and abnormality has been occurring in the suppressing unit Q, and it is possible to suppress occurrence of partial oxidation reaction in the cathodes 12 of the fuel cell 100. As a result, it is possible to suppress degradation of the fuel cell 100.

In addition, in the fuel cell system 1000 according to the present embodiment, in the abnormality detecting process, the display device 99 indicates that the fuel cell 100 is abnormal and abnormality has been occurring in the suppressing unit Q when it is determined that the fuel cell 100 is abnormal and abnormality has been occurring in the suppressing unit Q, that is, when the abnormality detecting flag is on. By so doing, an administrator of the fuel cell system 1000 is able to quickly recognize abnormality of the fuel cell system 1000, and is able to promptly solve the abnormality of the fuel cell system 1000.

In the fuel cell system 1000 according to the present embodiment, in the abnormality detecting process, the control circuit 400 executes abnormality detection of the fuel cell 100 or the suppressing unit Q on the basis of the voltage variation ΔXf when the amount Hf of hydrogen is larger than the threshold Ht1 (that is, when the amount Hf of hydrogen is relatively large). By so doing, when the fuel cell 100 or the suppressing unit Q is abnormal, it is possible to suppress erroneous detection.

In the abnormality detecting process, the fuel cell system 1000 according to the present embodiment determines (detects) that the fuel cell 100 is abnormal and abnormality has been occurring in the suppressing unit Q when the amount Hf of hydrogen is smaller than or equal to the threshold Ht1 and the period of time Tf1 that elapses from when the suppression state is formed by the suppressing unit Q to when the fuel cell voltage Vf becomes smaller than the threshold Vt1 is longer than the threshold Tt1. By so doing, when the amount Hf of hydrogen is relatively small, it is possible to accurately detect a condition that the high voltage state continues from when the suppression state is formed. Thus, it is possible to accurately detect abnormality of the fuel cell 100 or the suppressing unit Q. In accordance with this, it is possible to prevent leaving a situation that the fuel cell 100 is abnormal and abnormality has been occurring in the suppressing unit Q, and it is possible to suppress occurrence of partial oxidation reaction in the cathodes 12 of the fuel cell 100. As a result, it is possible to suppress degradation of the fuel cell 100.

In the abnormality detecting process of the fuel cell system 1000 according to the present embodiment, when the control circuit 400 determines that abnormality has been occurring in the suppressing unit Q (step S50 or step S240), the control circuit 400 may particularly determine that the cathode sealing valve 70 is abnormal within the suppressing unit Q. By so doing, it is possible to detect abnormality of the cathode sealing valve 70 without using a leakage detection sensor, or the like.

In the present embodiment, the hydrogen shut-off valve 40, the purge valve 85, the cathode sealing valve 70, the compressor 30 and the seal members 700 are examples included in the suppressing unit Q according to the aspect of the invention. In addition, the cathode sealing valve 70 is an example of a cathode-side emission suppressing valve according to the aspect of the invention. In addition, the hydrogen shut-off valve 40 is an example of a fuel gas shut-off valve according to the aspect of the invention. In addition, the compressor 30 is an example of an oxidation gas supply pump according to the aspect of the invention. In addition, the purge valve 85 is an example of an anode-side emission suppressing valve according to the aspect of the invention. In addition, the control circuit 400 is an example of a voltage detecting unit, a voltage variation detecting unit or an abnormality detecting unit according to the aspect of the invention. Furthermore, the threshold Ht1 is an example of a first amount determination value or a second amount determination value according to the aspect of the invention. In addition, the threshold Xt1 is an example of a first voltage variation determination value according to the aspect of the invention. In addition, the threshold Vt1 is an example of a fourth voltage determination value according to the aspect of the invention. In addition, the threshold Tt1 is an example of a fifth time determination value according to the aspect of the invention. In addition, the display device 99 is an example of a notification unit according to the aspect of the invention.

Next, a second embodiment will be described. A fuel cell system according to the second embodiment has a configuration similar to that of the fuel cell system 1000 according to the first embodiment, so like reference numerals denote similar components, and the description there of is omitted. The fuel cell system according to the present embodiment executes abnormality detecting process, part of which is slightly different from that of the fuel cell system 1000. The abnormality detecting process according to the present embodiment, as in the case of the abnormality detecting process according to the first embodiment, is executed in the fuel cell system as the suppression state is set by the suppressing unit Q after normal power generation is terminated.

Figure 6:
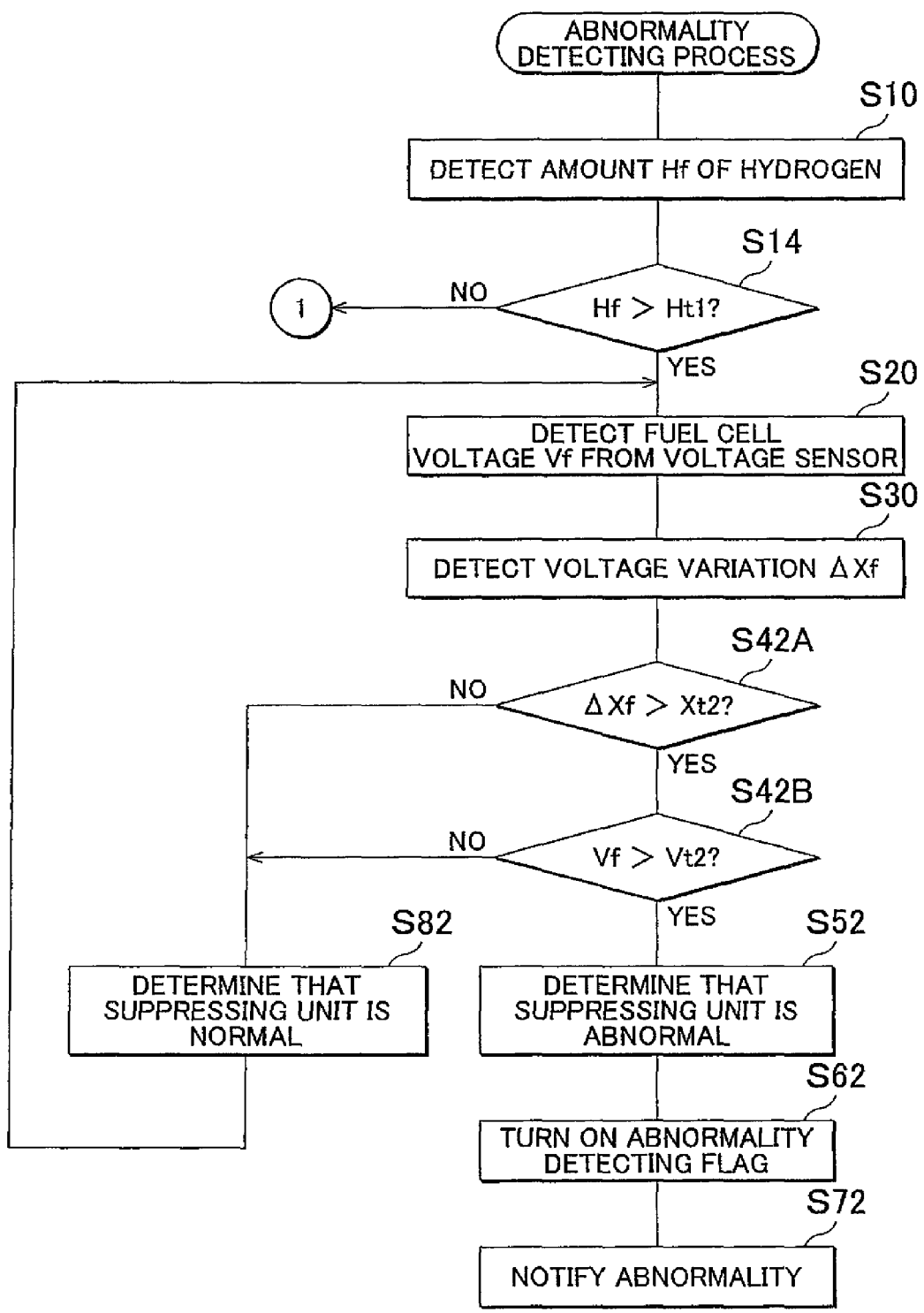
FIG. 6 is a flowchart that shows an abnormality detecting process executed by a fuel cell system according to a second embodiment of the invention.

FIG. 6 is a flowchart that shows an abnormality detecting process executed by the fuel cell system according to the present embodiment. The abnormality detecting process is continuously executed until an electric power request is received again from the outside of the fuel cell system, that is, until the next normal power generation operation of the fuel cell 100 is started. Before the abnormality detecting process, the abnormality detecting flag stored in the RAM is in an off state. In the abnormality detecting process according to the present embodiment, like step numbers denote processes similar to those of the abnormality detecting process according to the first embodiment, and the description of the similar processes is omitted. Note that in this case, the processes following the case where the amount Hf of hydrogen is smaller than or equal to the threshold Ht1 (Yes in step S14) are not shown in the drawing; however, processes similar to the processes (see FIG. 5) in step S200 to step S270 in the abnormality detecting process according to the first embodiment are executed.

The control circuit 400 detects the fuel cell voltage Vf in step S20, detects (calculates) the voltage variation ΔXf that indicates that a variation in fuel cell voltage per unit time in step S30, and then determines whether the detected voltage variation ΔXf is larger than a threshold Xt2 (see FIG. 3A and FIG. 3B) (step S42A).

When the voltage variation ΔXf is larger than the threshold Xt2 (Yes in step S42A), the control circuit 400 subsequently determines whether the fuel cell voltage Vf is larger than a threshold Vt2 (see FIG. 3A and FIG. 3B) (step S42B).

When the fuel cell voltage Vf is larger than the threshold Vt2 (Yes in step S42B), it may be presumed that the voltage of the fuel cell 100 has entered a low voltage state and then the voltage has steeply increased, so the control circuit 400 determines (detects) that, in the fuel cell system, the fuel cell 100 is abnormal and, as a factor of the abnormality, abnormality has been occurring in the suppressing unit Q (step S52).

When the control circuit 400 determines (detects) that the fuel cell 100 is abnormal and abnormality has been occurring in the suppressing unit Q, the control circuit 400 turns on the abnormality detecting flag stored in the RAM (step S62).

Then, the control circuit 400 indicates (notifies), on the display device 99, that the fuel cell 100 is abnormal and abnormality has been occurring in the suppressing unit Q (step S72).

On the other hand, when the voltage variation ΔXf is smaller than or equal to the threshold Xt2 (No in step S42A) or when the fuel cell voltage Vf is lower than or equal to the threshold Vt2 (No in step S42B), it may be presumed that the fuel cell 100 is maintained in a low voltage state, so the control circuit 400 determines (detects) that the fuel cell 100 is normal and the suppressing unit Q is normally functioning (step S82). After the control circuit 400 determines (detects) that the suppressing unit Q is normally functioning, the process returns to step S20.

The threshold Xt2 and the threshold Vt2 are larger than or equal to zero, and are appropriately determined on the basis of a specific design, or the like, of the fuel cell system according to the present embodiment.

In the abnormality detecting process, the fuel cell system 1000 according to the present embodiment determines (detects) that the fuel cell 100 is abnormal and abnormality has been occurring in the suppressing unit Q when the amount Hf of hydrogen is larger than the threshold Ht1 (that is, when the amount Hf of hydrogen is relatively large) and when the voltage variation ΔXf is larger than the threshold Xt2 and the fuel cell voltage Vf is higher than the threshold Vt2. By so doing, it is possible to accurately detect a steep increase in voltage after the voltage of the fuel cell 100 enters a low voltage state with an increase in voltage variation ΔXf and an increase in fuel cell voltage Vf. Thus, it is possible to accurately detect abnormality of the fuel cell 100 or abnormality of the suppressing unit Q. In accordance with this, it is possible to prevent leaving a situation that the fuel cell 100 is abnormal and abnormality has been occurring in the suppressing unit Q, and it is possible to suppress occurrence of partial oxidation reaction in the cathodes 12 of the fuel cell 100. As a result, it is possible to suppress degradation of the fuel cell 100.

In the abnormality detecting process of the fuel cell system 1000 according to the present embodiment, when the control circuit 400 determines that abnormality has been occurring in the suppressing unit Q (step S52 or step S240), the control circuit 400 may particularly determine that the cathode sealing valve 70 is abnormal within the suppressing unit Q. By so doing, it is possible to detect abnormality of the cathode sealing valve 70 without using a leakage detection sensor, or the like.

In the present embodiment, the hydrogen shut-off valve 40, the purge valve 85, the cathode sealing valve 70, the compressor 30 and the seal members 700 are examples included in the suppressing unit Q according to the aspect of the invention. In addition, the cathode sealing valve 70 is an example of the cathode-side emission suppressing valve according to the aspect of the invention. In addition, the hydrogen shut-off valve 40 is an example of the fuel gas shut-off valve according to the aspect of the invention. In addition, the compressor 30 is an example of the oxidation gas supply pump according to the aspect of the invention. In addition, the purge valve 85 is an example of the anode-side emission suppressing valve according to the aspect of the invention. In addition, the control circuit 400 is an example of the voltage detecting unit, the voltage variation detecting unit or the abnormality detecting unit according to the aspect of the invention. In addition, the threshold Xt2 is an example of a second voltage variation determination value according to the aspect of the invention. In addition, the threshold Vt2 is an example of a first voltage determination value according to the aspect of the invention. In addition, the display device 99 is an example of the notification unit according to the aspect of the invention.

Next, a third embodiment will be described. A fuel cell system according to the third embodiment has a configuration similar to that of the fuel cell system 1000 according to the first embodiment, so like reference numerals denote similar components, and the description there of is omitted. The fuel cell system according to the present embodiment executes abnormality detecting process, part of which is slightly different from that of the fuel cell system 1000. The abnormality detecting process according to the present embodiment, as in the case of the abnormality detecting process according to the first embodiment, is executed in the fuel cell system as the suppression state is set by the suppressing unit Q after normal power generation is terminated.

Figure 7:
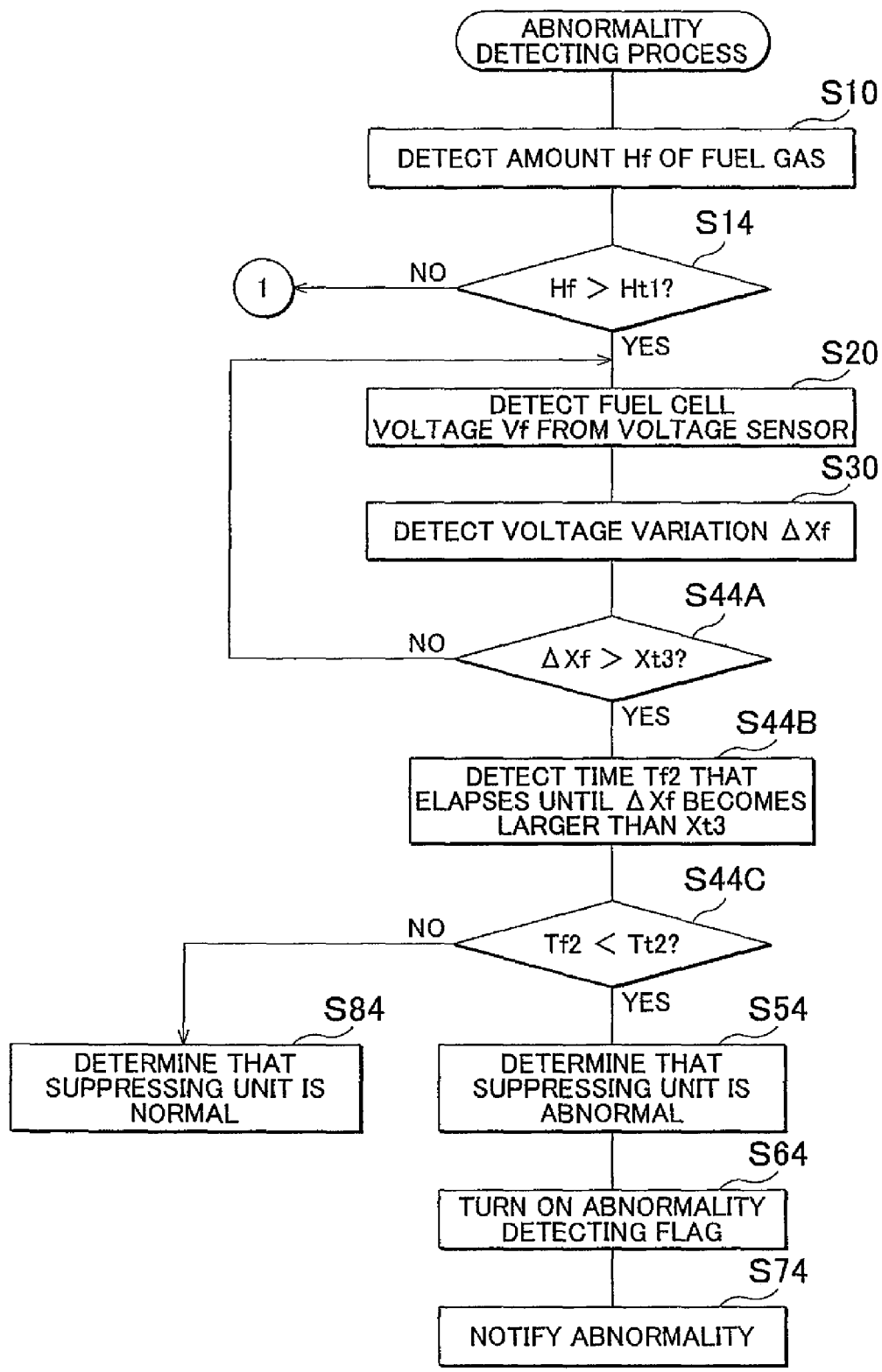
FIG. 7 is a flowchart that shows an abnormality detecting process executed by a fuel cell system according to a third embodiment of the invention.

FIG. 7 is a flowchart that shows an abnormality detecting process executed by the fuel cell system according to the present embodiment. Before the abnormality detecting process, the abnormality detecting flag stored in the RAM is in an off state. In the abnormality detecting process according to the present embodiment, like step numbers denote processes similar to those of the abnormality detecting process according to the first embodiment, and the description of the similar processes is omitted. Note that in this case, the processes following the case where the amount Hf of hydrogen is smaller than or equal to the threshold Ht1 (Yes in step S14) are not shown in the drawing; however, processes similar to the processes (see FIG. 5) in step S200 to step S270 in the abnormality detecting process according to the first embodiment are executed.

The control circuit 400 detects the fuel cell voltage Vf in step S20, detects (calculates) the voltage variation ΔXf that indicates that a variation in fuel cell voltage per unit time in step S30, and then determines whether the detected voltage variation ΔXf is larger than a threshold Xt3 (step S44A).

When the detected voltage variation ΔXf is smaller than or equal to the threshold Xt3 (No in step S44A), the control circuit 400 returns to step S20.

When the detected voltage variation ΔXf is larger than the threshold Xt3 (Yes in step S44A), the control circuit 400 detects a period of time Tf2 that elapses from when the suppression state is formed by the suppressing unit Q to when the voltage variation ΔXf becomes larger than the threshold Xt3 (step S44B).

The control circuit 400 determines whether the period of time Tf2 is shorter than a threshold Tt2 (step S44C).

When the period of time Tf2 is shorter than the threshold Tt2 (Yes in step S44C), it may be presumed that an increase in voltage has occurred in a relatively short period of time after entering the low-voltage state, that is, it may be presumed that air larger than or equal to an allowable amount flows into the cathodes 12 via the suppressing unit Q, so the control circuit 400 determines (detects) that, in the fuel cell system, abnormality has been occurring in the suppressing unit Q and, accordingly, the fuel cell 100 is abnormal (step S54).

When the control circuit 400 determines (detects) that the fuel cell 100 is abnormal and abnormality has been occurring in the suppressing unit Q, the control circuit 400 turns on the abnormality detecting flag stored in the RAM (step S64).

Then, the control circuit 400 indicates (notifies), on the display device 99, that the fuel cell 100 is abnormal and abnormality has been occurring in the suppressing unit Q (step S74).

On the other hand, when the period of time Tf2 is longer than or equal to the threshold Tt2 (No in step S44C), it may be presumed that an increase in voltage has occurred in a relatively long period of time after entering the low voltage state, that is, it may be presumed that, even when air flows into the cathodes 12 via the suppressing unit Q, the amount of air falls within the allowable amount, so the control circuit 400 determines (detects) that the suppressing unit Q is normally functioning and, accordingly, the fuel cell 100 is normal (step S84).

The threshold Xt3 and the threshold Tt2 are larger than or equal to zero, and are appropriately determined on the basis of a specific design, or the like, of the fuel cell system according to the present embodiment.

Figure 8A:
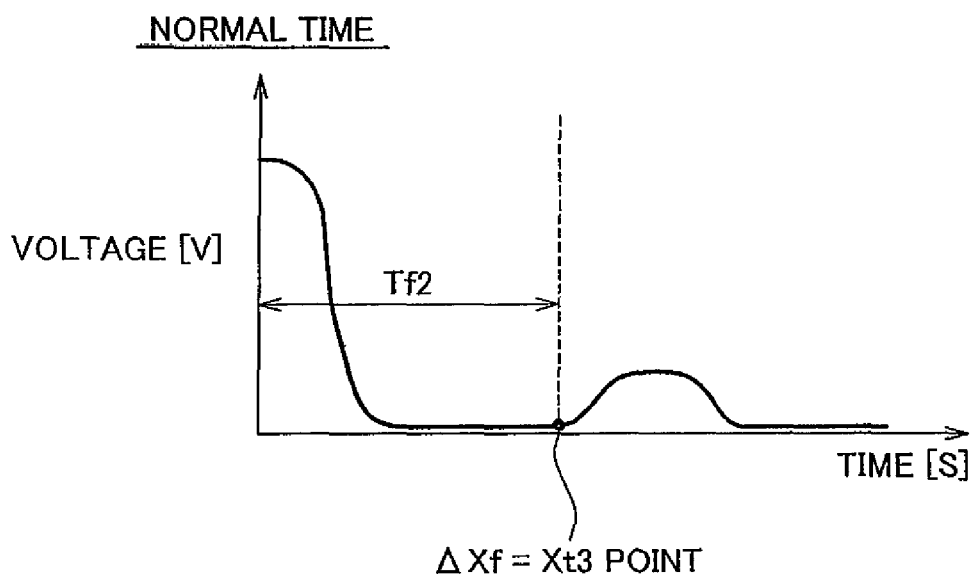
FIG. 8A and FIG. 8B are graphs that illustrate examples of progression of voltage of a fuel cell after a suppression state is set according to the third embodiment.
Figure 8B:
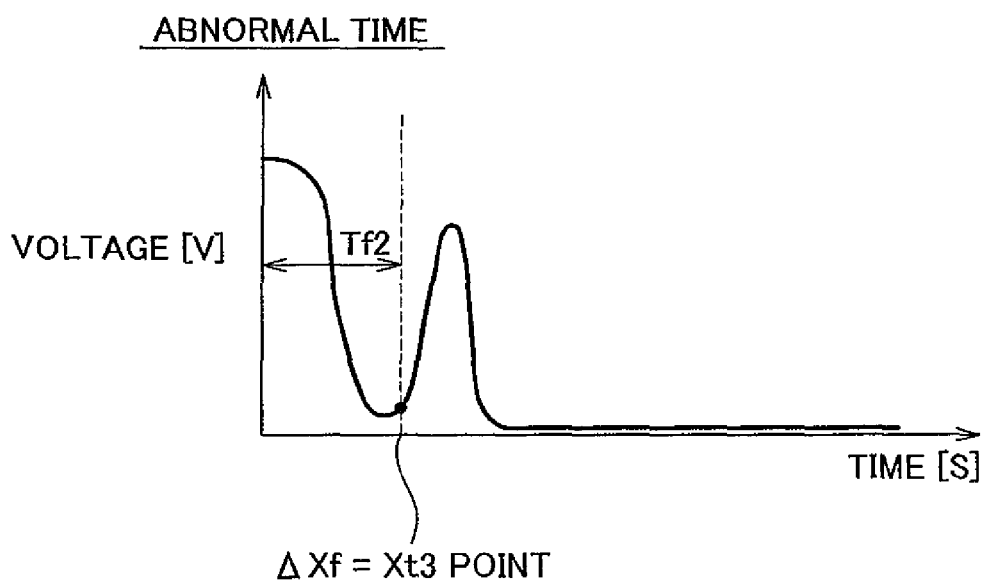

FIG. 8A and FIG. 8B are graphs that illustrate examples of progression of voltage of the fuel cell 100 after the suppression state is set. FIG. 8A shows an example of progression of voltage after the suppression state is set when the fuel cell 100 (the fuel-cell cells 10) is normal. FIG. 8B shows an example of progression of voltage after the suppression state is set when the fuel cell 100 (the fuel-cell cells 10) is abnormal. In the abnormality detecting process, the fuel cell system according to the present embodiment determines (detects) that the fuel cell 100 is abnormal and abnormality has been occurring in the suppressing unit Q when the amount Hf of hydrogen is larger than the threshold Ht1 and the period of time Tf2 that elapses from when the suppression state is formed by the suppressing unit Q to when the voltage variation ΔXf becomes larger than the threshold Xt3 is shorter than the threshold Tt2. By so doing, as shown in FIG. 8A and FIG. 8B, the condition that air larger than or equal to the allowable amount flows into the cathodes 12 may be accurately detected on the basis of a change in the voltage variation ΔXf. Thus, it is possible to accurately detect abnormality of the fuel cell 100 or the suppressing unit Q. In accordance with this, it is possible to prevent leaving a situation that the fuel cell 100 is abnormal and abnormality has been occurring in the suppressing unit Q, and it is possible to suppress occurrence of partial oxidation reaction in the cathodes 12 of the fuel cell 100. As a result, it is possible to suppress degradation of the fuel cell 100.

In the abnormality detecting process of the fuel cell system 1000 according to the present embodiment, when the control circuit 400 determines that abnormality has been occurring in the suppressing unit Q (step S54 or step S240), the control circuit 400 may particularly determine that the cathode sealing valve 70 is abnormal within the suppressing unit Q. By so doing, it is possible to detect abnormality of the cathode sealing valve 70 without using a leakage detection sensor, or the like.

In the present embodiment, the hydrogen shut-off valve 40, the purge valve 85, the cathode sealing valve 70, the compressor 30 and the seal members 700 are examples included in the suppressing unit Q according to the aspect of the invention. In addition, the cathode sealing valve 70 is an example of the cathode-side emission suppressing valve according to the aspect of the invention. In addition, the hydrogen shut-off valve 40 is an example of the fuel gas shut-off valve according to the aspect of the invention. In addition, the compressor 30 is an example of the oxidation gas supply pump according to the aspect of the invention. In addition, the purge valve 85 is an example of the anode-side emission suppressing valve according to the aspect of the invention. In addition, the control circuit 400 is an example of the voltage detecting unit, the voltage variation detecting unit or the abnormality detecting unit according to the aspect of the invention. In addition, the threshold Xt3 is an example of a third voltage variation determination value according to the aspect of the invention. In addition, the threshold Tt2 is an example of a first time determination value according to the aspect of the invention. In addition, the display device 99 is an example of the notification unit according to the aspect of the invention.

Next, a fourth embodiment will be described. A fuel cell system according to the fourth embodiment has a configuration similar to that of the fuel cell system 1000 according to the first embodiment, so like reference numerals denote similar components, and the description there of is omitted. The fuel cell system according to the present embodiment executes abnormality detecting process, part of which is slightly different from that of the fuel cell system 1000. The abnormality detecting process according to the present embodiment, as in the case of the abnormality detecting process according to the first embodiment, is executed in the fuel cell system as the suppression state is set by the suppressing unit Q after normal power generation is terminated.

FIG. 9 is a flowchart that shows an abnormality detecting process executed by the fuel cell system according to the present embodiment. The abnormality detecting process is continuously executed until an electric power request is received again from the outside of the fuel cell system, that is, until the next normal power generation operation of the fuel cell 100 is started. Before the abnormality detecting process, the abnormality detecting flag stored in the RAM is in an off state. In the abnormality detecting process according to the present embodiment, like step numbers denote processes similar to those of the abnormality detecting process according to the first embodiment, and the description of the similar processes is omitted. Note that in this case, the processes following the case where the amount Hf of hydrogen is smaller than or equal to the threshold Ht1 (Yes in step S14) are not shown in the drawing; however, processes similar to the processes (see FIG. 5) in step S200 to step S270 in the abnormality detecting process according to the first embodiment are executed.

The control circuit 400 detects the fuel cell voltage Vf in step S20, detects (calculates) the voltage variation ΔXf that indicates that a variation in fuel cell voltage per unit time in step S30, and then determines whether the detected voltage variation ΔXf is larger than a threshold Xt4 (step S42A).

When the voltage variation ΔXf is larger than the threshold Xt4 (Yes in step S46A), the control circuit 400 subsequently determines whether the fuel cell voltage Vf is higher than a threshold Vt3 (step S46B).

When the fuel cell voltage Vf is higher than the threshold Vt3 (Yes in step S46B), the control circuit 400 detects the fuel cell voltage Vf from the voltage sensor 90 again (step S46C), and then determines whether the detected fuel cell voltage Vf is lower than a threshold Vt4 (step S46D). When the detected fuel cell voltage Vf is higher than or equal to the threshold Vt4 (No in step S46D), the control circuit 400 returns to step S46C.

When the fuel cell voltage Vf detected in step S46C is lower than the threshold Vt4 (Yes in step S46D), the control circuit 400 detects a period of time Tf3 that elapses until the fuel cell voltage Vf becomes higher than the threshold Vt3 in step S46B and the fuel cell voltage Vf becomes lower than the threshold Vt4 in step S46D (step S46E).

The control circuit 400 determines whether the period of time Tf3 is shorter than a threshold Tt3 (step S46F).

When the period of time Tf3 is shorter than the threshold Tt3 (Yes in step S46F), it may be presumed that the voltage has steeply fluctuated in a relatively short period of time after entering a low voltage state, that is, it may be presumed that air larger than or equal to the allowable amount has flown into the cathode 12 via the suppressing unit Q, so the control circuit 400 determines (detects) that, in the fuel cell system, abnormality has been occurring in the suppressing unit Q and, accordingly, the fuel cell 100 is abnormal (step S56).

When the control circuit 400 determines (detects) that the fuel cell 100 is abnormal and abnormality has been occurring in the suppressing unit Q, the control circuit 400 turns on the abnormality detecting flag stored in the RAM (step S66).

Then, the control circuit 400 indicates (notifies), on the display device 99, that the fuel cell 100 is abnormal and abnormality has been occurring in the suppressing unit Q (step S76).

On the other hand, when the voltage variation ΔXf is smaller than or equal to the threshold Xt4 (No in step S46A) or when the fuel cell voltage Vf is lower than or equal to the threshold Vt3 (No in step S46B), the fuel cell 100 is maintained in a low voltage state, so the control circuit 400 determines (detects) that the fuel cell 100 is normal and the suppressing unit Q is normally functioning (step S86).

In addition, when the period of time Tf3 is longer than or equal to the threshold Tt3 (No in step S46F), it may be presumed that the voltage is fluctuating gently, that is, it may be presumed that, even when air flows into the cathodes 12 via the suppressing unit Q, the amount of air falls within the allowable amount, so the control circuit 400 determines (detects) that the suppressing unit Q is normally functioning and, accordingly, the fuel cell 100 is normal (step S86). After the control circuit 400 determines (detects) that the suppressing unit Q is normally functioning, the process returns to step S20.

The threshold Xt4, the threshold Vt3, the threshold Vt4 and the threshold Tt3 are larger than or equal to zero, and are appropriately determined on the basis of a specific design, or the like, of the fuel cell system according to the present embodiment.

Figure 10A:
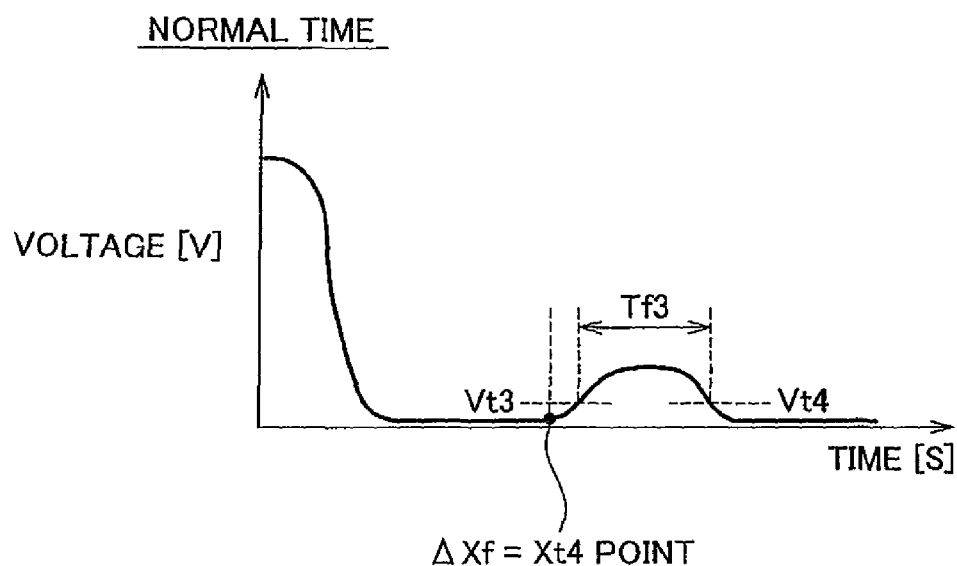
FIG. 10A and FIG. 10B are graphs that illustrate examples of progression of voltage of a fuel cell after a suppression state is set according to the fourth embodiment.
Figure 10B:
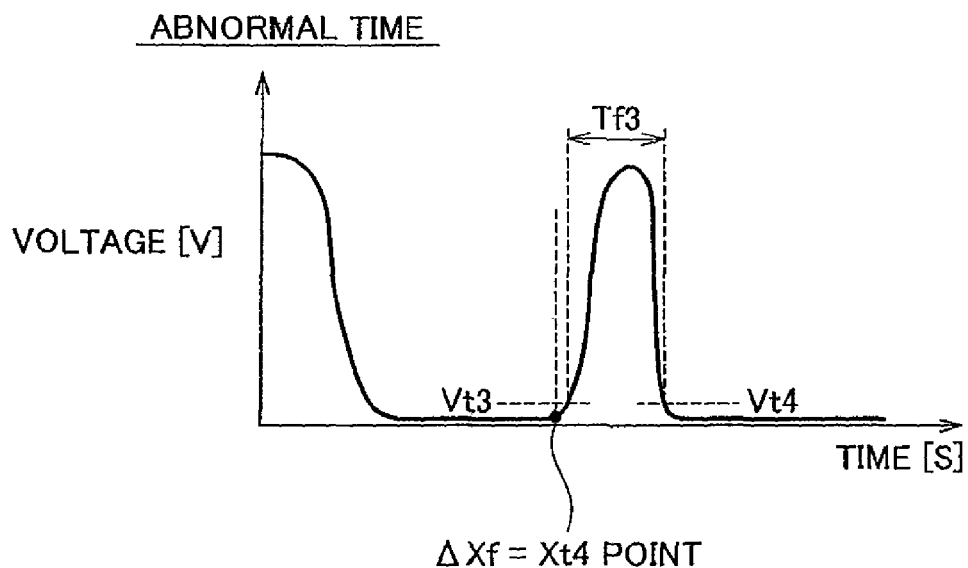

FIG. 10A and FIG. 10B are graphs that illustrate examples of progression of voltage of the fuel cell 100 after the suppression state is set. FIG. 10A shows an example of progression of voltage after the suppression state is set when the fuel cell 100 (the fuel-cell cells 10) is normal. FIG. 10B shows an example of progression of voltage after the suppression state is set when the fuel cell 100 (the fuel-cell cells 10) is abnormal. In the abnormality detecting process, the fuel cell system 1000 according to the present embodiment determines (detects) that the fuel cell 100 is abnormal and abnormality has been occurring in the suppressing unit Q when the amount Hf of hydrogen is larger than the threshold Ht1 and when the period of time Tf3 that elapses from when the fuel cell voltage Vf becomes higher than the threshold Vt3 to when the fuel cell voltage Vf becomes lower than the threshold Vt4 is shorter than the threshold Tt3. By so doing, as shown in FIG. 10A and FIG. 10B, the condition that air larger than or equal to the allowable amount flows into the cathodes 12 may be accurately detected on the basis of a change in the voltage variation ΔXf. Thus, it is possible to accurately detect abnormality of the fuel cell 100 or the suppressing unit Q. In accordance with this, it is possible to prevent leaving a situation that the fuel cell 100 is abnormal and abnormality has been occurring in the suppressing unit Q, and it is possible to suppress occurrence of partial oxidation reaction in the cathodes 12 of the fuel cell 100. As a result, it is possible to suppress degradation of the fuel cell 100.

In the abnormality detecting process of the fuel cell system 1000 according to the present embodiment, when the control circuit 400 determines (detects) that abnormality has been occurring in the suppressing unit Q (step S56 or step S240), the control circuit 400 may particularly determine that the cathode sealing valve 70 is abnormal within the suppressing unit Q. By so doing, it is possible to detect abnormality of the cathode sealing valve 70 without using a leakage detection sensor, or the like.

In the present embodiment, the hydrogen shut-off valve 40, the purge valve 85, the cathode sealing valve 70, the compressor 30 and the seal members 700 are examples included in the suppressing unit Q according to the aspect of the invention. In addition, the cathode sealing valve 70 is an example of the cathode-side emission suppressing valve according to the aspect of the invention. In addition, the hydrogen shut-off valve 40 is an example of the fuel gas shut-off valve according to the aspect of the invention. In addition, the compressor 30 is an example of the oxidation gas supply pump according to the aspect of the invention. In addition, the purge valve 85 is an example of the anode-side emission suppressing valve according to the aspect of the invention. In addition, the control circuit 400 is an example of the voltage detecting unit, the voltage variation detecting unit or the abnormality detecting unit according to the aspect of the invention. In addition, the threshold Xt4 is an example of a fourth voltage variation determination value according to the aspect of the invention. In addition, the threshold Vt3 is an example of a second voltage determination value according to the aspect of the invention. In addition, the threshold Vt4 is an example of a third voltage determination value according to the aspect of the invention. In addition, the threshold Tt3 is an example of a second time determination value according to the aspect of the invention. In addition, the display device 99 is an example of the notification unit according to the aspect of the invention.

Figure 11:
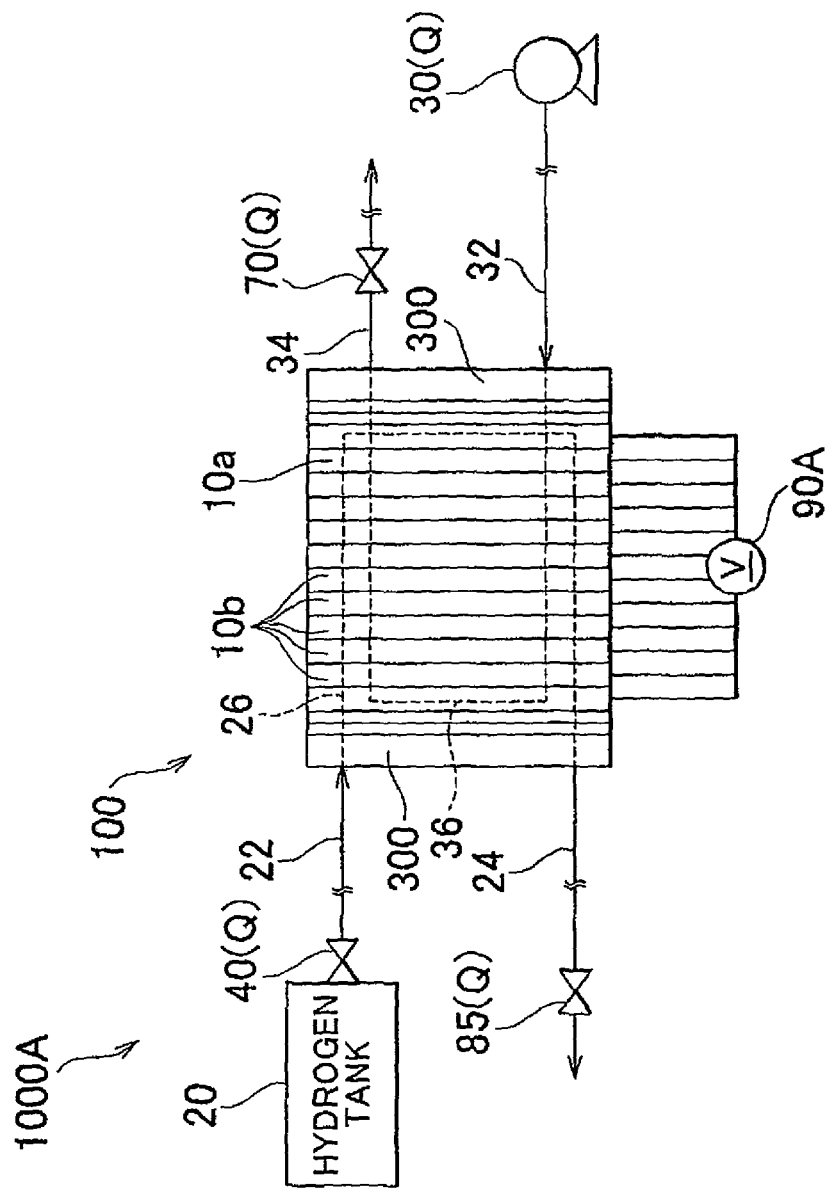
FIG. 11 is a schematic view that shows the configuration of a fuel cell system according to a fifth embodiment of the invention.

Next, a fifth embodiment will be described. FIG. 11 is a schematic view that shows the configuration of a fuel cell system 1000A according to the fifth embodiment of the invention. The fuel cell system according to the fifth embodiment basically has a configuration similar to that of the fuel cell system 1000 according to the first embodiment; however the fuel cell system according to the fifth embodiment differs from the fuel cell system 1000 according to the first embodiment in the following points. That is, the fuel cell system 1000A according to the present embodiment is formed so that the fuel cell 100 is divided into a plurality of fuel-cell cell groups (hereinafter, each fuel-cell cell group is also referred to as cell group). Each cell group includes three fuel-cell cells 10. As shown in FIG. 11, among the cell groups, a cell group located closest to a portion at which the cathode passage 36 (oxidation gas exhaust manifold) is connected to the air exhaust passage 34 is also termed cell group 10a, and the other cell groups are also termed cell groups 10b. In addition, as shown in FIG. 11, the fuel cell system 1000A includes a voltage sensor 90A that detects the voltages of the cell group 10a and cell groups 10b (hereinafter, also referred to as cell group voltages). Hereinafter, the voltage of the cell group 10a and the voltages of the cell groups 10b, which are detected by the voltage sensor 90A, are also respectively referred to as a cell group voltage Vs1 and cell group voltages Vs2. In the fuel cell system 1000A according to the present embodiment, like reference numerals denote similar components to those of the fuel cell system 1000 according to the first embodiment, and the description thereof is omitted.

The fuel cell system 1000A according to the present embodiment executes abnormality detecting process different from that of the fuel cell system 1000. The abnormality detecting process according to the present embodiment, as in the case of the abnormality detecting process according to the first embodiment, is executed in the fuel cell system as the suppression state is set by the suppressing unit Q after normal power generation is terminated.

Figure 12:
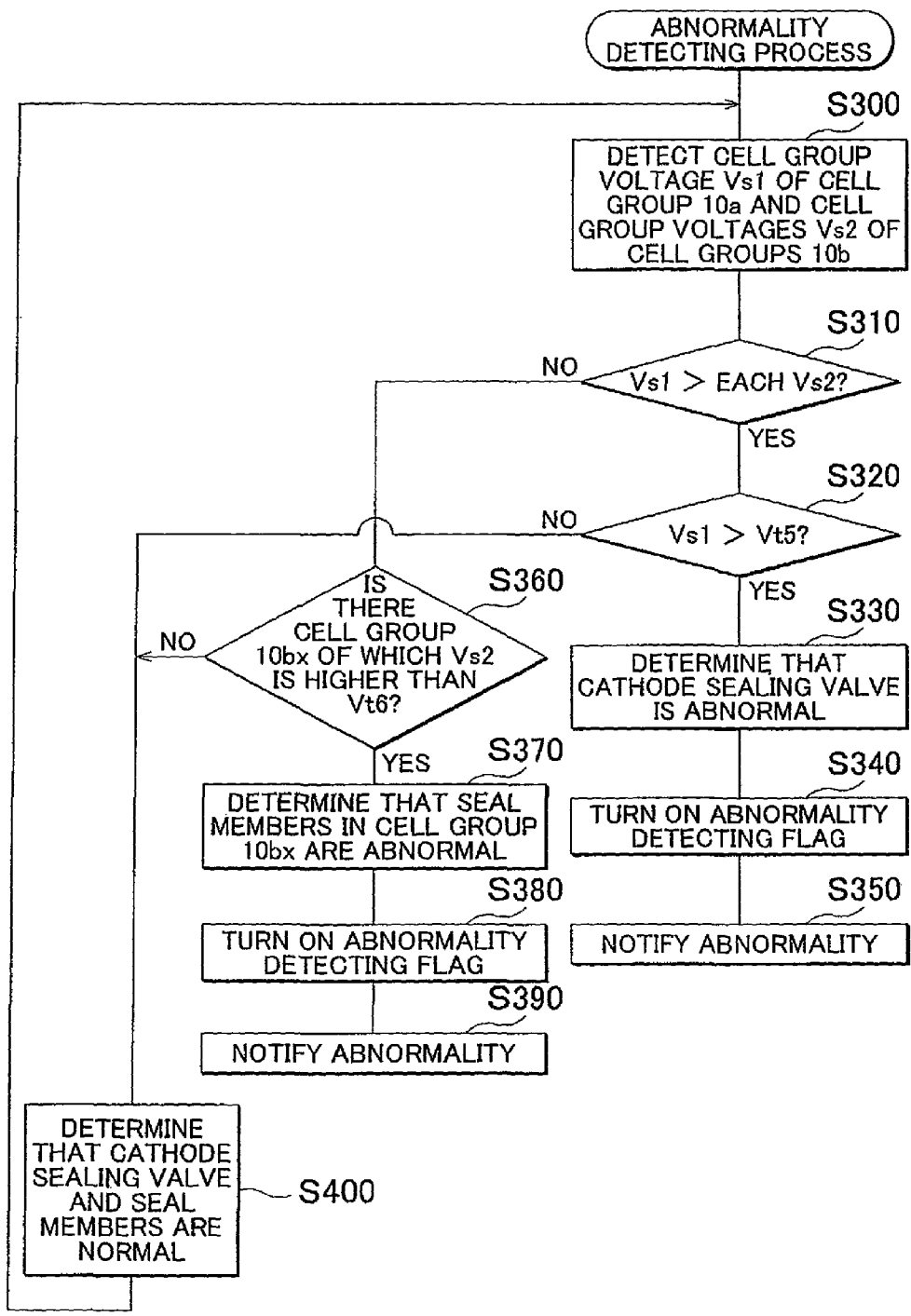
FIG. 12 is a flowchart that shows an abnormality detecting process executed by the fuel cell system according to the fifth embodiment.

FIG. 12 is a flowchart that shows an abnormality detecting process executed by the fuel cell system 1000A according to the present embodiment. The abnormality detecting process is continuously executed until an electric power request is received again from the outside of the fuel cell system 1000A, that is, until the next normal power generation operation of the fuel cell 100 is started. Before the abnormality detecting process, the abnormality detecting flag stored in the RAM is in an off state.

The control circuit 400 detects the cell group voltage Vs1 and the cell group voltages Vs2 from the voltage sensor 90A (step S300).

The control circuit 400 determines whether the cell group voltage Vs1 is higher than each of the cell group voltages Vs2, that is, whether the cell group voltage Vs1 is the highest among the cell group voltages (step S310).

When the cell group voltage Vs1 is higher than each of the cell group voltages Vs2 (Yes in step S310), the control circuit 400 subsequently determines whether the cell group voltage Vs1 is higher than a threshold Vt5 (step S320).

When the cell group voltage Vs1 is higher than the threshold Vt5 (Yes in step S320), it may be presumed that, among the cell groups, the cell group 10a close to the cathode sealing valve 70 is higher in voltage than each of the cell groups 10b, and the cell group voltage Vs1 is in a high voltage state, that is, it may be presumed that air larger than or equal to an allowable amount flows into the cathodes 12 of the cell group 10a via the cathode sealing valve 70, so the control circuit 400 determines (detects) that the cathode sealing valve 70 is abnormal (step S330).

When the control circuit 400 determines (detects) that the cathode sealing valve 70 is abnormal, the control circuit 400 turns on the abnormality detecting flag stored in the RAM (step S340).

Then, the control circuit 400 indicates (notifies), on the display device 99, that the cathode sealing valve 70 is abnormal (step S350).

On the other hand, when there is any cell group 10b (hereinafter, also referred to as cell group 10bx) that has the cell group voltage Vs2 higher than or equal to the cell group voltage Vs1 (No in step S310), the control circuit 400 determines whether the cell group voltage vs2 of that cell group 10bx is higher than a threshold Vt6 (step S360).

When the cell group voltage Vs2 of the cell group 10bx is higher than the threshold Vt6 (Yes in step S360), it may be presumed that air larger than or equal to the allowable amount flows into the predetermined fuel-cell cells 10 in the cell group 10bx, so the control circuit 400 determines (detects) that the seal members 700 of a predetermined fuel-cell cell 10 in the cell group 10bx are abnormal (step S370).

When the control circuit 400 determines (detects) that the seal members 700 of the predetermined fuel-cell cell 10 in the cell group 10bx are abnormal, the control circuit turns on the abnormality detecting flag stored in the RAM (step S380).

Then, the control circuit 400 indicates (notifies), on the display device 99, that the seal members 700 of the predetermined fuel-cell cells 10 in the cell group 10bx are abnormal (step S390).

In addition, when the cell group voltage Vs1 of the cell group 10a is lower than or equal to the threshold Vt5 (No in step S320) or when the cell group voltage Vs2 of the cell group 10bx is lower than or equal to the threshold Vt6 (No in step S360), it may be presumed that each cell group voltage is maintained in a low voltage state, so the control circuit 400 determines (detects) that the cathode sealing valve 70 and the seal members 700 of each fuel-cell cell 10 in each cell group are normally functioning (step S400). After the control circuit 400 determines (detects) that the cathode sealing valve 70 and the seal members 700 are normally functioning, the process returns to step S300.

The threshold Vt5 and the threshold Vt6 are larger than or equal to zero, and are appropriately determined on the basis of a specific design, or the like, of the fuel cell system according to the present embodiment.

In the abnormality detecting process, the fuel cell system 1000A according to the present embodiment determines (detects) that the cathode sealing valve 70 is abnormal when the cell group voltage Vs1 is higher than each of the cell group voltages Vs2 and when the cell group voltage Vs1 is higher than the threshold Vt5. By so doing, flow of air via the cathode sealing valve 70 may be accurately detected on the basis of the cell group voltage Vs1 and the cell group voltages Vs2. Thus, it is possible to accurately detect abnormality of the cathode sealing valve 70. In accordance with this, it is possible to prevent leaving a situation that the cathode sealing valve 70 is abnormal, and it is possible to suppress occurrence of partial oxidation reaction in the cathodes 12 of the fuel cell 100. As a result, it is possible to suppress degradation of the fuel cell 100.

In addition, in the abnormality detecting process, the fuel cell system 1000A according to the present embodiment determines (detects) that the seal members 700 of the predetermined fuel-cell cells 10 in the cell group 10bx are abnormal when the cell group voltage Vs1 is lower than or equal to each of the cell group voltages Vs2 and when there is the cell group 10*bx* of which the cell group voltage Vs2 is higher than the threshold Vt6. By so doing, flow of air through the seal members 700 of the fuel-cell cells 10 in the cell group 10*bx* may be accurately detected on the basis of the cell group voltage Vs1 in the cell group 10*a* and the cell group voltage Vs2 in the cell group 10*bx*. Thus, it is possible to accurately detect abnormality of the seal members 700. In accordance with this, it is possible to prevent leaving a situation that the seal member 700 are abnormal, and it is possible to suppress occurrence of partial oxidation reaction in the cathodes 12 of the fuel cell 100. As a result, it is possible to suppress degradation of the fuel cell 100.

In the present embodiment, the hydrogen shut-off valve 40, the purge valve 85, the cathode sealing valve 70, the compressor 30 and the seal members 700 are examples included in the suppressing unit Q according to the aspect of the invention. In addition, the cathode sealing valve 70 is an example of the cathode-side emission suppressing valve according to the aspect of the invention. In addition, the hydrogen shut-off valve 40 is an example of the fuel gas shut-off valve according to the aspect of the invention. In addition, the compressor 30 is an example of the oxidation gas supply pump according to the aspect of the invention. In addition, the purge valve 85 is an example of the anode-side emission suppressing valve according to the aspect of the invention. In addition, the control circuit 400 is an example of the voltage detecting unit, the voltage variation detecting unit or the abnormality detecting unit according to the aspect of the invention. Furthermore, the threshold Vt5 is an example of a fifth voltage determination value according to the aspect of the invention. In addition, the threshold Vt6 is an example of a sixth voltage determination value according to the aspect of the invention. In addition, the cell group 10*a* is an example of a fuel-cell cell group adjacent to a side surface of a fuel cell stack according to the aspect of the invention. The cell group 10*bx* is an example of a high-voltage fuel-cell cell group according to the aspect of the invention. In addition, the display device 99 is an example of the notification unit according to the aspect of the invention.

The embodiments are described above; alternative embodiments to the above embodiments will be described below. The aspect of the invention is not limited to the embodiments described above; it may be modified into various forms without departing from the scope of the invention. For example, the following alternative embodiments are also applicable.

A first alternative embodiment will be described. In the fuel cell system according to the fourth embodiment, as shown in FIG. 9, FIG. 10A and FIG. 10B, the control circuit 400, in the abnormality detecting process (FIG. 9), determines (detects) that abnormality has been occurring in the suppressing unit Q when the period of time Tf3 that elapses from when the fuel cell voltage Vf becomes higher than the threshold Vt3 to when the fuel cell voltage Vf becomes lower than the threshold Vt4 is shorter than the threshold Tt3 (step S46F in FIG. 9). However, the aspect of the invention is not limited to this configuration.

For example, the control circuit 400 may determine (detect) that abnormality has been occurring in the suppressing unit Q when the voltage variation ΔXf becomes larger than the threshold Xt5, and the voltage variation ΔXf becomes approximately zero (the fuel cell voltage Vf becomes a local maximum) and then the voltage variation ΔXf becomes negative to decrease the fuel cell voltage Vf and thereafter the fuel cell voltage Vf becomes lower than the threshold Vt5, and when a period of time Tf4 that elapses from when the voltage variation ΔXf becomes larger than the threshold Xt5 to when the fuel cell voltage Vf becomes lower than the threshold Vt5 is shorter than a threshold Tt4. By so doing, the condition that air larger than or equal to the allowable amount flows into the cathodes 12 may be accurately detected on the basis of a change in the voltage variation ΔXf. Thus, it is possible to accurately detect abnormality of the fuel cell 100 or the suppressing unit Q. In accordance with this, it is possible to prevent leaving a situation that the fuel cell 100 is abnormal and abnormality has been occurring in the suppressing unit Q, and it is possible to suppress occurrence of partial oxidation reaction in the cathodes 12 of the fuel cell 100. As a result, it is possible to suppress degradation of the fuel cell 100.

Note that the threshold Xt5, the threshold Vt5 and the threshold Tt4 are larger than or equal to zero, and are appropriately determined on the basis of a specific design, or the like, of the fuel cell system according to the present embodiment. In addition, the threshold Xt5 is an example of a fifth voltage variation determination value according to the aspect of the invention. In addition, the threshold Vt5 is an example of a fourth voltage determination value according to the aspect of the invention. In addition, the threshold Tt4 is an example of a third time determination value according to the aspect of the invention.

In addition, the control circuit 400 may determine (detect) that the fuel cell 100 is abnormal and abnormality has been occurring in the suppressing unit Q when the voltage variation ΔXf is larger than the threshold Xt6 and then the voltage variation ΔXf becomes approximately zero, and when a period of time Tf5 that elapses from when the voltage variation ΔXf becomes larger than the threshold Xt6 to when the voltage variation ΔXf becomes approximately zero is shorter than the threshold Tt5. By so doing, the condition that air larger than or equal to the allowable amount flows into the cathodes 12 may be accurately detected on the basis of a change in the voltage variation ΔXf. Thus, it is possible to accurately detect abnormality of the fuel cell 100 or the suppressing unit Q. In accordance with this, it is possible to prevent leaving a situation that the fuel cell 100 is abnormal and abnormality has been occurring in the suppressing unit Q, and it is possible to suppress occurrence of partial oxidation reaction in the cathodes 12 of the fuel cell 100. As a result, it is possible to suppress degradation of the fuel cell 100.

The threshold Xt6 and the threshold Tt5 are larger than or equal to zero, and are appropriately determined on the basis of a specific design, or the like, of the fuel cell system according to the present embodiment. In addition, the threshold Xt6 is an example of a sixth voltage variation determination value according to the aspect of the invention. In addition, the threshold Tt5 is an example of a fourth time determination value according to the aspect of the invention.

Next, a second alternative embodiment will be described. In the fuel cell system according to the second embodiment, the control circuit 400, in the abnormality detecting process (FIG. 6), determines (detects) that the fuel cell 100 is abnormal and abnormality has been occurring in the suppressing unit Q when the voltage variation ΔXf is larger than the threshold Xt2 and the fuel cell voltage Vf is higher than the threshold Vt2. However, the aspect of the invention is not limited to this configuration. For example, the control circuit 400 may determine (detect) that the fuel cell 100 is abnormal and abnormality has been occurring in the suppressing unit Q when the fuel cell voltage Vf becomes higher than the threshold Vt2 after a predetermined period of time has elapsed since the suppression state was set by the suppressing unit Q. By so doing as well, similar advantageous effects to those of the above embodiments may be obtained.

Next, a third alternative embodiment will be described. In the fuel cell system according to the first to fourth embodiments, the control circuit 400, in the abnormality detecting process (FIG. 4, FIG. 5, FIG. 6, FIG. 7 and FIG. 9), determines in step S14 whether the amount Hf of hydrogen is larger than the threshold Ht1, and then executes the process in step S20 and the following steps when the amount Hf of hydrogen is larger than the threshold Ht1 or executes the process in step S200 and the following steps when the amount Hf of hydrogen is smaller than or equal to the threshold Ht1. However, the aspect of the invention is not limited to this configuration. For example, the control circuit 400 may execute the process in step S20 and the following steps in the abnormality detecting process (FIG. 4, FIG. 6, FIG. 7 and FIG. 9) irrespective of the amount Hf of hydrogen. By so doing as well, similar advantageous effects to those of the above embodiments may be obtained. In addition, the control circuit 400 may execute the process in step S200 and the following steps in the abnormality detecting process (see FIG. 5) irrespective of the amount Hf of hydrogen. By so doing as well, similar advantageous effects to those of the above embodiments may be obtained.

Next, a fourth alternative embodiment will be described. In the fuel cell system according to the first embodiment to the fourth embodiment, the control circuit 400 detects abnormality of the fuel cell system 1000 (the fuel cell 100 or the suppressing unit Q) on the basis of the fuel cell voltage Vf, which is the total voltage of the fuel-cell cells 10. However, the aspect of the invention is not limited to this configuration. For example, the control circuit 400 may detect the cell group voltage of a cell group formed of one or more fuel cells 100 and then may detect abnormality of the fuel cell system 1000 (one or more fuel cells 100 or the suppressing unit Q) on the basis of the cell group voltage. By so doing as well, similar advantageous effects to those of the above embodiments may be obtained.

Next, a fifth alternative embodiment will be described. In the fuel cell system according to the above embodiments, the control circuit 400 controls the load connecting unit 60 to interrupt connection between the fuel cell 100 and the electrical load 500 at the time when normal power generation is terminated. However, the aspect of the invention is not limited to this configuration. For example, the control circuit 400 may control the load connecting unit 60 to interrupt connection between the fuel cell 100 and the electrical load 500 after normal power generation is terminated by the time when the suppression state is set. In this case, the control circuit 400 may particularly continues connection between the fuel cell 100 and the electrical load 500 until immediately before the suppression state is set and then may interrupt the connection between the fuel cell 100 and the electrical load 500 at the time when the suppression state is set. By so doing, in the fuel cell 100, oxygen is promptly consumed through power generation at the cathodes 12, so it is possible to make the voltage of the fuel cell 100 enter a low voltage state promptly after the suppression state is set.

Next, a sixth alternative embodiment will be described. In the fuel cell system according to the above embodiments, the control circuit 400 executes abnormality detecting process as the suppression state is set. However, the aspect of the invention is not limited to this configuration. For example, the control circuit 400 may execute abnormality detecting process after a predetermined period of time has elapsed since the suppression state was set. By so doing, when the voltage of the fuel cell 100 temporarily increases immediately after the suppression state is set because of various factors, it is possible to suppress erroneous detection of abnormality of the fuel cell system (the fuel cell 100, the suppressing unit Q). Note that the condition that "the voltage of the fuel cell 100 temporarily increases immediately after the suppression state is set" may be presumably, for example, a case (see the above fifth alternative embodiment) where connection between the fuel cell 100 and the electrical load 500 is interrupted at the time when the suppression state is set.

Next, a seventh alternative embodiment will be described. In the fuel cell system according to the above embodiments, the control circuit 400 may execute any two or more of the abnormality detecting processes (see FIG. 4, FIG. 5, FIG. 6, FIG. 7, FIG. 9 and FIG. 12) in parallel with each other according to the first embodiment to the fifth embodiment and the first alternative embodiment to the fourth alternative embodiment. In addition, the control circuit 400 may execute the abnormality detecting processes of the first embodiment to the fifth embodiment and the abnormality detecting processes of the first alternative embodiment to the third alternative embodiment in parallel with one another. By so doing, it is possible to accurately detect abnormality of the fuel cell 100 or the suppressing unit Q.

Next, an eighth alternative embodiment will be described. In the fuel cell system 1000A according to the fifth embodiment, the control circuit 400, in the abnormality detecting process, may detect a cell group voltage (hereinafter, also referred to as cell group voltage Vs3) of the cell group 10b closest to a portion at which the anode passage 26 is connected to the hydrogen exhaust passage 24, and then may determine (detect) that the purge valve 85 is abnormal when the cell group voltage Vs3 is higher than the cell group voltage Vs2 other than the cell group voltage Vs3 and when the cell group voltage Vs3 is higher than a threshold Vt7. By so doing, flow of air into the anodes 13 via the purge valve 85 may be accurately detected on the basis of the cell group voltage Vs1 and the cell group voltage Vs3 of the cell group 10b closest to the portion at which the anode passage 26 is connected to the hydrogen exhaust passage 24. Thus, it is possible to accurately detect abnormality of the purge valve 85, it is possible to prevent leaving a situation that abnormality has been occurring in the purge valve 85, and it is possible to suppress occurrence of partial oxidation reaction in the cathodes 12 of the fuel cell 100. As a result, it is possible to suppress degradation of the fuel cell 100.

Note that it is also applicable that abnormality of the compressor 30 or seal members provided at a portion at which the fuel cell 100 is connected to each passage (the air exhaust passage 34, the air supply passage 32, the hydrogen exhaust passage 24 and the hydrogen supply passage 22) is detected on the basis of the cell group voltage of each cell group in the fuel cell 100.

Next, a ninth alternative embodiment will be described. In the fuel cell system according to the above embodiments, the control circuit 400, in the normal power generation termination process, closes the hydrogen shut-off valve 40, and stops the circulating pump 80 and the compressor 30 to stop supply of hydrogen (fuel gas) and air (oxidation gas) to the fuel cell 100. However, the aspect of the invention is not limited to this configuration. For example, the control circuit 400, in the normal power generation termination process, may not completely close the hydrogen shut-off valve 40 and not completely stop the compressor 30 but continue supply of hydrogen and air by a slight amount.

Next, a tenth alternative embodiment will be described. In the fuel cell system according to the fifth embodiment, each of the cell groups includes three fuel-cell cells 10; however, the aspect of the invention is not limited to this configuration. Each of the cell groups may include one, two, four or more fuel-cell cells 10. By so doing as well, similar advantageous effects to those of the above embodiment may be obtained.

Next, an eleventh alternative embodiment will be described. In the fuel cell system according to the above embodiments, an air backflow shut-off valve may be arranged in the air supply passage 32. In this case, the control circuit 400 closes the air backflow shut-off valve together with the cathode sealing valve 70 after the normal power generation termination process. In accordance with this, in the fuel cell system 1000, introduction and emission of hydrogen to and from the anode-side passage AR are suppressed, and introduction and emission of air to and from the cathode-side passage CR are suppressed (hereinafter, also referred to as suppression state). Thus, the air backflow shut-off valve is included in the suppressing unit Q. By so doing, it is possible to suppress flow of air to the cathode-side passage CR via the compressor 30.

Next, a twelfth alternative embodiment will be described. In the fuel cell system according to the above embodiments, the solid polymer fuel cell is used as the fuel cell 100; however, the aspect of the invention is not limited to this configuration. Instead, various types of fuel cells, such as a solid oxide fuel cell and a molten carbonate fuel cell, may be used.

Next, a thirteenth alternative embodiment will be described. Hydrogen is used as fuel gas, and air is used as oxidation gas; however, the aspect of the invention is not limited to this configuration. For example, reformed gas may be used as fuel gas. In addition, it is only necessary that gas containing air is used as oxidation gas. For example, mixed gas of air and oxygen may be used.

Next, a fourteenth alternative embodiment will be described. The fuel cell 100 according to the above embodiments includes the plurality of fuel-cell cells 10; however, the aspect of the invention is not limited to this configuration. The fuel cell 100 may be formed of a single fuel-cell cell 10.

The invention claimed is:

1. A fuel cell system comprising:
a fuel cell that includes at least one fuel-cell cell having an anode, a cathode and an electrolyte membrane;
an anode-side passage adapted to supply and exhaust fuel gas to and from the anode of the at least one fuel-cell cell;
a cathode-side passage adapted to supply and exhaust oxidation gas to and from the cathode of the at least one fuel-cell cell;
a voltage detecting unit adapted to detect a voltage of the fuel cell;
a suppressing unit adapted to set a suppression state where, after normal power generation of the fuel cell is terminated, introduction of the fuel gas to the anode-side passage and introduction of the oxidation gas to the cathode-side passage are suppressed as compared with those during the normal power generation, and emission of the fuel gas from the anode-side passage to an outside of the anode-side passage and emission of the oxidation gas from the cathode-side passage to an outside of the cathode-side passage are suppressed as compared with those during the normal power generation;
an abnormality detecting unit comprising a controller that is programmed to detect, after the suppression state is set by the suppressing unit, abnormality of the fuel cell system on the basis of the voltage detected by the voltage detecting unit or a variation in the detected voltage, and
a voltage variation detecting unit adapted to detect a voltage variation, which is real number value, per unit time at a predetermined time interval on the basis of the voltage detected by the voltage detecting unit, wherein
the abnormality detecting unit comprising the controller is programmed to detect, that the fuel cell system is abnormal when a period of time that elapses from when the suppression state is set to when the voltage variation detected by the voltage variation detecting unit becomes a third voltage variation determination value, which is larger than or equal to zero, is shorter than a first time determination value.

2. A fuel cell system comprising:
a fuel cell that includes at least one fuel-cell cell having an anode, a cathode and an electrolyte membrane;
an anode-side passage adapted to supply and exhaust fuel gas to and from the anode of the at least one fuel-cell cell;
a cathode-side passage adapted to supply and exhaust oxidation gas to and from the cathode of the at least one fuel-cell cell;
a voltage detecting unit adapted to detect a voltage of the fuel cell;
a suppressing unit adapted to set a suppression state where, after normal power generation of the fuel cell is terminated, introduction of the fuel gas to the anode-side passage and introduction of the oxidation gas to the cathode-side passage are suppressed as compared with those during the normal power generation, and emission of the fuel gas from the anode-side passage to an outside of the anode-side passage and emission of the oxidation gas from the cathode-side passage to an outside of the cathode-side passage are suppressed as compared with those during the normal power generation;
an abnormality detecting unit comprising a controller that is programmed to detect, after the suppression state is set by the suppressing unit, abnormality of the fuel cell system on the basis of the voltage detected by the voltage detecting unit or a variation in the detected voltage, and
a voltage variation detecting unit adapted to detect a voltage variation, which is real number value, per unit time at a predetermined time interval, wherein
the abnormality detecting unit comprising the controller is programmed to detect that the fuel cell system is abnormal when, after the suppression state is set, the voltage variation detected by the voltage variation detecting unit becomes larger than a fourth voltage variation determination value, which is larger than or equal to zero, the voltage detected by the voltage detecting unit becomes higher than a second voltage determination value, which is higher than or equal to zero, and then the voltage decreases to become lower than a third voltage determination value, and when a period of time that elapses from when the voltage becomes higher than the second voltage determination value to when the voltage becomes lower than the third voltage determination value is shorter than a second time determination value.

3. The fuel cell system according to claim 1, wherein
the abnormality detecting unit comprising the controller is programmed to detect that the fuel cell system is abnormal when, after the suppression state is set, the voltage variation detected by the voltage variation detecting unit becomes larger than a fifth voltage variation determination value, which is larger than or equal to zero, and the voltage variation becomes approximately zero and then the voltage detected by the voltage detecting unit becomes lower than a fourth voltage determination value, which is higher than or equal to zero, and when a period of time that elapses from when the voltage variation becomes larger than the fifth voltage variation determination value to when the voltage becomes smaller than the fourth voltage determination value is shorter than a third time determination value, which is longer than or equal to zero.

4. The fuel cell system according to claim 1, wherein the abnormality detecting unit comprising the controller is programmed to detect that the fuel cell system is abnormal when, after the suppression state is set, the voltage variation detected by the voltage variation detecting unit becomes larger than a sixth voltage variation determination value, which is larger than or equal to zero, and then the voltage variation becomes approximately zero, and when a period of time that elapses from when the voltage variation becomes larger than the sixth voltage variation determination value to when the voltage variation becomes approximately zero is shorter than a fourth time determination value.

5. The fuel cell system according to claim 1, wherein the abnormality detecting unit comprising the controller is programmed to execute abnormality detection of the fuel cell system based on the variation in the voltage when the amount of the fuel gas in the anode-side passage is larger than a first amount determination value.

6. The fuel cell system according to claim 1, wherein when the amount of the fuel gas in the anode-side passage is smaller than a second amount determination value, the abnormality detecting unit comprising the controller is programmed to detect that the fuel cell system is abnormal when a period of time that elapses from when the suppression state is set to when the voltage detected by the voltage detecting unit becomes lower than a fourth voltage determination value, which is higher than or equal to zero, is longer than a fifth time determination value.

7. The fuel cell system according to claim 1, wherein when the abnormality of the fuel cell is detected, the abnormality detecting unit comprising the controller is programmed to not use the variation in the voltage detected by the voltage detecting unit during a predetermined period of time after the suppression state is set.

8. The fuel cell system according to claim 1, further comprising:
a connecting unit adapted to connect an electrical load to the fuel cell for a predetermined period of time after the normal power generation in the fuel cell is terminated and before the suppressing unit sets the suppression state.

9. The fuel cell system according to claim 1, wherein the suppressing unit includes an anode-side emission suppressing valve that is arranged in the anode-side passage and that is adapted to suppress emission of fuel gas, which has been subjected to electrochemical reaction, from the anode of the at least one fuel-cell cell to an outside of the fuel cell, wherein the suppression state includes a state where the anode-side emission suppressing valve is closed.

10. The fuel cell system according to claim 1, wherein the suppressing unit includes an oxidation gas supply pump that is arranged in the cathode-side passage and that is adapted to supply oxidation gas to the cathode of the at least one fuel-cell cell, wherein the suppression state includes a state where the oxidation gas supply pump is stopped.

11. The fuel cell system according to claim 1, wherein the suppressing unit includes a fuel gas shut-off valve that is arranged in the anode-side passage and that is able to shut off supply of the fuel gas to the anode of the at least one fuel-cell cell, wherein the suppression state includes a state where the fuel gas shut-off valve is closed.

12. The fuel cell system according to claim 1, wherein the suppressing unit includes a cathode-side emission suppressing valve that is arranged in the cathode-side passage and that is adapted to suppress emission of oxidation gas, which has been subjected to electrochemical reaction, from the cathode of the at least one fuel-cell cell, to an outside of the fuel cell, wherein the suppression state includes a state where the cathode-side emission suppressing valve is closed.

13. The fuel cell system according to claim 1, wherein the fuel cell includes a fuel cell stack formed of a plurality of the fuel-cell cells,
the cathode-side passage includes an oxidation gas exhaust manifold that extends through the fuel cell stack in a stacking direction in which the fuel-cell cells are stacked and that is adapted to collect and exhaust oxidation gas, which has been subjected to electrochemical reaction in the cathode of each of the fuel-cell cells, and an oxidation gas emission passage that is connected to the oxidation gas exhaust manifold on a side surface of the fuel cell stack for emitting the oxidation gas, exhausted from the oxidation gas exhaust manifold, to an outside of the cathode-side passage,
the suppressing unit includes a cathode-side emission suppressing valve that is arranged in the oxidation gas emission passage and that suppresses emission of the oxidation gas to an outside of the fuel cell and a sealing portion that is adapted to suppress, in each fuel-cell cell, leakage of the oxidation gas from the cathode to an outside of the fuel-cell cell,
the voltage detecting unit is adapted to measure voltages of fuel-cell cell groups, each of which is formed of one or more of the fuel-cell cells, in the fuel cell stack, and
the abnormality detecting unit comprising the controller is programmed to detect abnormality of the cathode-side emission suppressing valve or abnormality of the sealing portion on the basis of the voltages of the fuel-cell cell groups detected by the voltage detecting unit or the variations in the detected voltages.

14. The fuel cell system according to claim 13, wherein the abnormality detecting unit comprising the controller is programmed to detect that the cathode-side emission suppressing valve is abnormal when the voltage of the fuel-cell cell group adjacent to the side surface of the fuel cell stack becomes higher than the voltages of the other fuel-cell cell groups and becomes higher than a fifth voltage determination value.

15. The fuel cell system according to claim 13; wherein when, among predetermined fuel-cell cell groups other than the fuel-cell cell group adjacent to the side surface of the fuel cell stack, a high-voltage fuel-cell cell group, of which the voltage becomes higher than the fuel-cell cell group adjacent to the side surface of the fuel cell stack, appears, and the voltage of the high-voltage fuel-cell cell group becomes higher than a sixth voltage determination value, the abnormality detecting unit comprising the controller is programmed to detect that the sealing portion in the high-voltage fuel-cell cell group is abnormal.

16. The fuel cell system according to claim 1, wherein the abnormality detecting unit further comprises a notification unit that is configured to notify the abnormality when the abnormality is detected.

17. The fuel cell system according to claim 2, wherein
the abnormality detecting unit comprising the controller is programmed to execute abnormality detection of the fuel cell system based on the variation in the voltage when the amount of the fuel gas in the anode-side passage is larger than a first amount determination value.

18. The fuel cell system according to claim 2, wherein
when the amount of the fuel gas in the anode-side passage is smaller than a second amount determination value, the abnormality detecting unit comprising the controller is programmed to detect that the fuel cell system is abnormal when a period of time that elapses from when the suppression state is set to when the voltage detected by the voltage detecting unit becomes lower than a fourth voltage determination value, which is higher than or equal to zero, is longer than a fifth time determination value.

19. The fuel cell system according to claim 2, wherein
when the abnormality of the fuel cell is detected, the abnormality detecting unit comprising the controller is programmed to not use the variation in the voltage detected by the voltage detecting unit during a predetermined period of time after the suppression state is set.

20. The fuel cell system according to claim 2, further comprising:
a connecting unit adapted to connect an electrical load to the fuel cell for a predetermined period of time after the normal power generation in the fuel cell is terminated and before the suppressing unit sets the suppression state.

21. The fuel cell system according to claim 2, wherein
the suppressing unit includes an anode-side emission suppressing valve that is arranged in the anode-side passage and that adapted to suppress emission of fuel gas, which has been subjected to electrochemical reaction, from the anode of the at least one fuel-cell cell to an outside of the fuel cell, wherein the suppression state includes a state where the anode-side emission suppressing valve is closed.

22. The fuel cell system according to claim 2, wherein
the suppressing unit includes an oxidation gas supply pump that is arranged in the cathode-side passage and that is adapted to supply oxidation gas to the cathode of the at least one fuel-cell cell, wherein the suppression state includes a state where the oxidation gas supply pump is stopped.

23. The fuel cell system according to claim 2, wherein
the suppressing unit includes a fuel gas shut-off valve that is arranged in the anode-side passage and that is able to shut off supply of the fuel gas to the anode of the at least one fuel-cell cell, wherein the suppression state includes a state where the fuel gas shut-off valve is closed.

24. The fuel cell system according to claim 2, wherein
the suppressing unit includes a cathode-side emission suppressing valve that is arranged in the cathode-side passage and that is adapted to suppress emission of oxidation gas, which has been subjected to electrochemical reaction, from the cathode of the at least one fuel-cell cell, to an outside of the fuel cell, wherein the suppression state includes a state where the cathode-side emission suppressing valve is closed.

25. The fuel cell system according to claim 2, wherein
the fuel cell includes a fuel cell stack formed of a plurality of the fuel-cell cells,
the cathode-side passage includes an oxidation gas exhaust manifold that extends through the fuel cell stack in a stacking direction in which the fuel-cell cells are stacked and that is adapted to collect and exhaust oxidation gas, which has been subjected to electrochemical reaction in the cathode of each of the fuel-cell cells, and an oxidation gas emission passage that is connected to the oxidation gas exhaust manifold on a side surface of the fuel cell stack for emitting the oxidation gas, exhausted from the oxidation gas exhaust manifold, to an outside of the cathode-side passage,
the suppressing unit includes a cathode-side emission suppressing valve that is arranged in the oxidation gas emission passage and that suppresses emission of the oxidation gas to an outside of the fuel cell and a sealing portion that is adapted to suppress, in each fuel-cell cell, leakage of the oxidation gas from the cathode to an outside of the fuel-cell cell,
the voltage detecting unit is adapted to measure voltages of fuel-cell cell groups, each of which is formed of one or more of the fuel-cell cells, in the fuel cell stack, and
the abnormality detecting unit comprising the controller is programmed to detect abnormality of the cathode-side emission suppressing valve or abnormality of the sealing portion on the basis of the voltages of the fuel-cell cell groups detected by the voltage detecting unit or the variations in the detected voltages.

26. The fuel cell system according to claim 25, wherein
the abnormality detecting unit comprising the controller is programmed to detect that the cathode-side emission suppressing valve is abnormal when the voltage of the fuel-cell cell group adjacent to the side surface of the fuel cell stack becomes higher than the voltages of the other fuel-cell cell groups and becomes higher than a fifth voltage determination value.

27. The fuel cell system according to claim 25, wherein
when, among predetermined fuel-cell cell groups other than the fuel-cell cell group adjacent to the side surface of the fuel cell stack, a high-voltage fuel-cell cell group, of which the voltage becomes higher than the fuel-cell cell group adjacent to the side surface of the fuel cell stack, appears, and the voltage of the high-voltage fuel-cell cell group becomes higher than a sixth voltage determination value, the abnormality detecting unit comprising the controller is programmed to detect that the sealing portion in the high-voltage fuel-cell cell group is abnormal.

28. The fuel cell system according to claim 2, wherein
the abnormality detecting unit further comprises a notification unit that is configured to notify the abnormality when the abnormality is detected.

* * * * *